United States Patent
Opp et al.

(10) Patent No.: US 11,741,965 B1
(45) Date of Patent: Aug. 29, 2023

(54) CONFIGURABLE NATURAL LANGUAGE OUTPUT

(71) Applicant: Amazon Technologies, Inc., Seattle, WA (US)

(72) Inventors: Ramsey Abou-Zaki Opp, Santa Barbara, CA (US); Anantdeep Gill, San Jose, CA (US); Angela Liu, Santa Barbara, CA (US); Anisha Jain, Santa Barbara, CA (US); Justin Maxwell Bollag, Santa Barbara, CA (US); Nathan Yeazel, Santa Barbara, CA (US); Sara Renee Bilich, Santa Barbara, CA (US); Spencer B Baker, Santa Barbara, CA (US)

(73) Assignee: Amazon Technologies, Inc., Seattle, WA (US)

(*) Notice: Subject to any disclaimer, the term of this patent is extended or adjusted under 35 U.S.C. 154(b) by 115 days.

(21) Appl. No.: 16/913,139

(22) Filed: Jun. 26, 2020

(51) Int. Cl.
| | |
|---|---|
| *G10L 15/26* | (2006.01) |
| *G10L 15/18* | (2013.01) |
| *G10L 13/08* | (2013.01) |
| *G10L 15/00* | (2013.01) |
| *G10L 13/00* | (2006.01) |
| *G10L 15/08* | (2006.01) |

(52) U.S. Cl.
CPC .............. *G10L 15/26* (2013.01); *G10L 13/00* (2013.01); *G10L 13/086* (2013.01); *G10L 15/005* (2013.01); *G10L 15/18* (2013.01); *G10L 2015/088* (2013.01)

(58) Field of Classification Search
CPC ........... G10L 15/26; G06F 40/30; G06F 40/40
See application file for complete search history.

(56) References Cited

U.S. PATENT DOCUMENTS

| | | | |
|---|---|---|---|
| 6,047,300 A * | 4/2000 | Walfish ................ | G06F 40/232 715/257 |
| 7,207,003 B1 * | 4/2007 | Berstis ................ | G06F 16/9577 715/207 |
| 10,957,329 B1 * | 3/2021 | Liu ....................... | G06F 16/3344 |
| 2007/0100628 A1 * | 5/2007 | Bodin ................... | G10L 13/033 704/261 |
| 2008/0059189 A1 * | 3/2008 | Stephens ............... | G10L 13/00 704/258 |
| 2008/0269958 A1 * | 10/2008 | Filev ..................... | A61B 5/18 701/1 |
| 2010/0042410 A1 * | 2/2010 | Stephens, Jr. .......... | G10L 13/10 704/260 |
| 2012/0047044 A1 * | 2/2012 | Lazuka .................. | G06Q 30/0611 705/26.4 |
| 2014/0310002 A1 * | 10/2014 | Nitz ....................... | G10L 15/22 704/270.1 |
| 2016/0224540 A1 * | 8/2016 | Stewart ................. | G06F 40/232 |

(Continued)

*Primary Examiner* — Jakieda R Jackson
(74) *Attorney, Agent, or Firm* — Pierce Atwood LLP

(57) ABSTRACT

A system is provided for determining a natural language output, responsive to a user input, using different speech personality profiles. The system may determine to user a particular language generation profile based at least in part on data relating to the user input and data corresponding to the response to the user input. The language generation profile may include different attributes that are used to determine the natural language output, such as, prosody, replacement words, injected words, sentence structure, etc.

20 Claims, 11 Drawing Sheets

(56) References Cited

U.S. PATENT DOCUMENTS

| | | | | |
|---|---|---|---|---|
| 2016/0241671 A1* | 8/2016 | Goel | ................ | H04L 67/306 |
| 2016/0379638 A1* | 12/2016 | Basye | ................ | G10L 15/18 |
| | | | | 704/235 |
| 2018/0309866 A1* | 10/2018 | Devaraj | ................ | G06Q 10/10 |
| 2018/0365212 A1* | 12/2018 | Banerjee | ................ | H04L 51/02 |
| 2020/0193972 A1* | 6/2020 | Feinauer | ................ | G06N 20/10 |
| 2020/0279553 A1* | 9/2020 | McDuff | ................ | G10L 25/78 |
| 2020/0317209 A1* | 10/2020 | Naiki | ................ | H04W 4/48 |
| 2020/0365169 A1* | 11/2020 | Selvaggi | ................ | G10L 21/10 |
| 2021/0110811 A1* | 4/2021 | Joseph | ................ | G10L 13/08 |

* cited by examiner

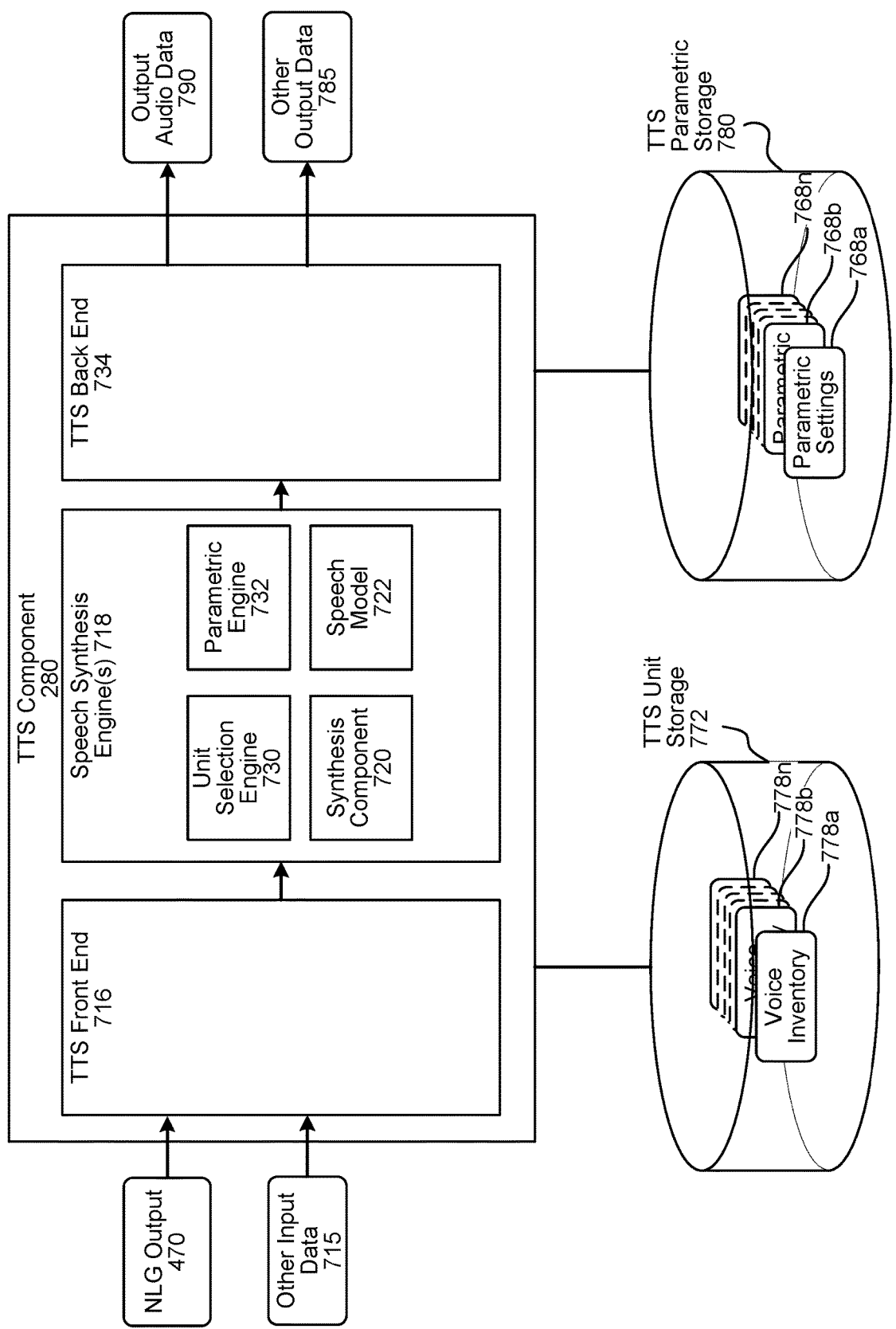

CONFIGURABLE NATURAL LANGUAGE OUTPUT

BACKGROUND

Spoken language understanding systems have progressed to the point where humans can interact with computing devices using their voices. Such systems employ techniques to identify the words spoken by a human user based on the various qualities of a received audio input. Speech recognition combined with natural language understanding techniques enable speech-based user control of a computing device to perform tasks based on the user's spoken commands. The combination of speech recognition and natural language understanding processing techniques is referred to herein as spoken language understanding.

Spoken language understanding may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIG. 7A is a conceptual diagram of text-to-speech components according to embodiments of the present disclosure.

DETAILED DESCRIPTION

Figure 1:
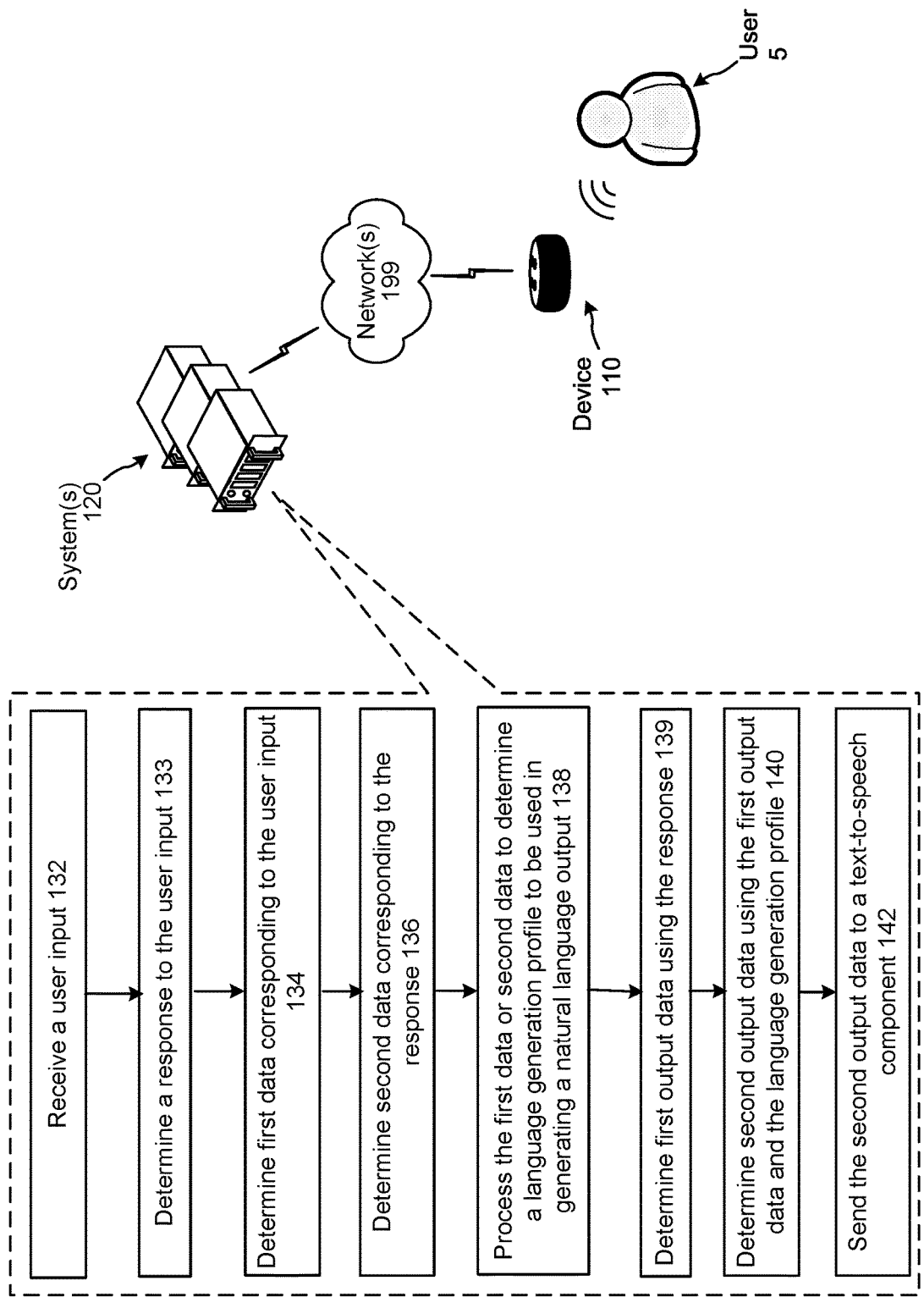
FIG. 1 illustrates a system configured to generate a natural language output, responsive to a user input, using a language generation profile according to embodiments of the present disclosure.

Automatic speech recognition (ASR) is a field of computer science, artificial intelligence, and linguistics concerned with transforming audio data associated with speech into text or other meaning representation data of the words in the speech. Natural language understanding (NLU) is a field of computer science, artificial intelligence, and linguistics concerned with enabling computers to derive semantic meaning from ASR output or other data representing natural language content. ASR and NLU are often used together as part of a spoken language understanding (SLU) system. Natural language generation (NLG) is a process that generates a natural language output in the form of structured data. Text-to-speech (TTS) is a field of concerning transforming the structured data or other meaning representation data into audio data that is synthesized to resemble human speech.

A system may receive a user input requesting the system to provide information or perform an action. For example, a user input may be "Alexa, what is today's weather?", "How tall is President <XYZ>?" or "What does a cow eat?" The system processes the user input, determines information responsive to the user input, and generates a natural language output that is presented to the user. For example, the system may respond "It is sunny today, with a high of 70," "President <XYZ> is 6 feet tall," or "A cow eats grass." In some cases, the natural language output is presented to the user as synthesized speech, that is, the system outputs audio representing the response.

The present disclosure describes techniques that enable a system to generate natural language outputs using a variety of speech/personality profiles. For example, the system may respond to a user input using synthesized speech in a pirate voice (e.g., using a pirate language generation profile). In furtherance of this example, in response to the user input "what is the weather today," the system may output synthesized speech corresponding to "Ahoy matey, it is sunny today." The present disclosure enables storing of various language generation profiles that can be used to generate the natural language output in a particular style.

According to the teachings of the present disclosure, the system determines to use/apply a particular language generation profile based on various triggers, such as, user preferences, device profile information/device location, subject matter/content of the user input, subject matter/content of the system response, etc. For example, if the user input relates to a farm animal (e.g., cow), the system may determine to use a friendly language generation profile, and the response may be "A cow eats grass, y'all." In another example, a device located at a themed hotel may respond to a user input using a language generation profile of a character/personality of the themed hotel.

A language generation profile may specify various attributes to be used to determine a natural language output. For example, the attributes may indicate how certain words are to be spoken (e.g., prosody, pitch, rate, volume, tone, emphasis, infliction, emotion, etc.), insertion of a particular word(s)/phrase(s), replacement of a particular word(s)/phrase(s), a particular sentence structure to be used, and/or other attributes.

The system of the present disclosure may improve a user experience, in particular, by presenting responses using different language generation profiles/personalities.

FIG. 1 illustrates a system configured to generate a natural language output using a language generation profile according to embodiments of the present disclosure. Although the figure and discussion herein illustrate certain operational steps of the system in a particular order, the steps described may be performed in a different order (as well as certain steps removed or added) without departing from the intent of the disclosure. As illustrated in FIG. 1, the system may include device 110 local to a user 5, in communication with one or more systems 120 across one or more networks 199.

The system(s) 120 receives (132) a user input. The user input may include audio data representing an utterance spoken by the user 5 and captured by the device 110. The system(s) 120 may perform spoken language understanding (SLU) processing using the audio data. As part of SLU processing, the system(s) 120 may perform automatic speech recognition (ASR) processing on the audio data to determine data representing the user input, such as text data, an ASR hypothesis, etc., as described below in relation to FIG. 2. As part of SLU processing, the system(s) 120 may perform natural language understanding (NLU) processing on the text data/user input to determine the user's intent.

The system(s) 120 determines (133) a response to the user input. The system(s) 120 may determine a response as described below in relation to FIG. 2. In some embodiments, the system(s) 120 may select a component (e.g., a skill component 290) based on the intent, domain, entity(ies), etc. corresponding to the user input, and the selected component may determine the response to the user input. The response may be represented as in various forms of data, for example, for the user input "what is the weather today?", the response may include the data representing {sunny, high of 70, low of 50} or data representing {windy, cloudy}, etc. In another example, for the user input "how tall is President XYZ?", the response may include the data {6 feet}.

The system(s) 120 determines (134) first data corresponding to the user input, such as, contextual data corresponding to the user input. The first data may include user profile data corresponding to the user 5, data related to the device 110, and other information described in detail with relation to FIG. 4 below. The system(s) 120 determines (136) second data corresponding to the response to the user input. For example, the second data may include NLU data corresponding to the user input (such as intent data and entity values/types), selected skill to respond to the user input, etc.

The system(s) 120 processes (138) the first data, the second data, or both to determine a language generation profile to be used in generating a natural language output to the user input. As such, the system(s) 120 may select a language generation profile based on contextual information related to the user input (e.g., user profile data, device information, location, etc.) and/or based on information related to how the response is generated (e.g., intent, domain, entity types/values, etc.). Based on the first data and/or the second data, the system(s) 120 may determine to present the natural language output in a particular style as indicated by the selected language generation profile. A language generation profile may include one or more attributes that are to be used in generating the natural language output, where the attributes may indicate, a prosody to be applied to the output, one or more words to be injected in the output, one or more words to be replaced with other one or more words, a sentence structure to be used, etc. (as described in detail below with respect to FIG. 5).

The system(s) 120 may select the language generation profile from a plurality of language generation profiles as described in detail below with respect to FIG. 4. For example, the system(s) 120 may select the language generation profile based on data, provided by the skill/application/component, indicating a preferred language generation profile and/or a topic of the response. The system(s) 120 may additionally or alternatively select the language generation profile based on the entity(ies) included in the user input and/or response. The system(s) 120 may additionally or alternatively select the language generation profile based on device 110 information, such as device profile, device type, device location, etc.

The system(s) 120 determines (139) first output data using the response. The first output data may be a (generic) natural language output determined using a default/generic language generation template. For example, for the user input "what's the weather today?" or "how tall is President XYZ", the first output data may be "It is sunny, with a high of 70s and low of 50s" or "President XYZ is 6 feet tall". The first output data may be structured data that is understandable by a TTS processing component (e.g., TTS component 280) to generate synthesized speech.

The system(s) 120 determines (140) second output data using the first output data and the language generation profile. The second output data may represent a modified version of the natural language output represented in the first output data to the user input, where the natural language output is modified based on attributes associated with the selected language generated profile. The language generation profile may include word selection data representing one or more of: word(s) to be inserted in the generic natural language output, word(s) to be replaced in the generic natural language output, sentence structure to be applied to the generic natural language output, speech prosody to be applied to parts of the generic natural language output, etc. For example, the second output data may represent the natural language response: "Aargh it is sunny today! With a high of 70s and low of 50s matey," or "President XYZ is 6 feet tall. That is totally crazy!"

The second output data may include one or more synthesized speech markup language (SSML) tags applying the attributes of the language generation profile to the first output data. The second output data may be structured data that is understandable by a TTS processing component (e.g., a TTS component 280 illustrated in and described with respect to FIG. 2) to generate audio data representing synthesized speech corresponding to the natural language output. The system(s) 120 sends (142) the second output data to the TTS component, which may process the output data as described in detail with respect to FIGS. 7A and 7B. In some cases, the second output data (determined in step 140) may be displayed via the device 110 or presented in another manner to the user 5, instead of being converted to synthesized speech.

In other cases, the user input may be another form input (e.g., text data, selection of one or more graphical user interface elements via a device display, selection of one or more physical buttons of the device 110, gestures, sensor data, etc.). The user input may be processed by the system(s) 120 to determine a representation of the user input that can be understood by the NLU component 260 and other components of the SLU system.

Figure 2:
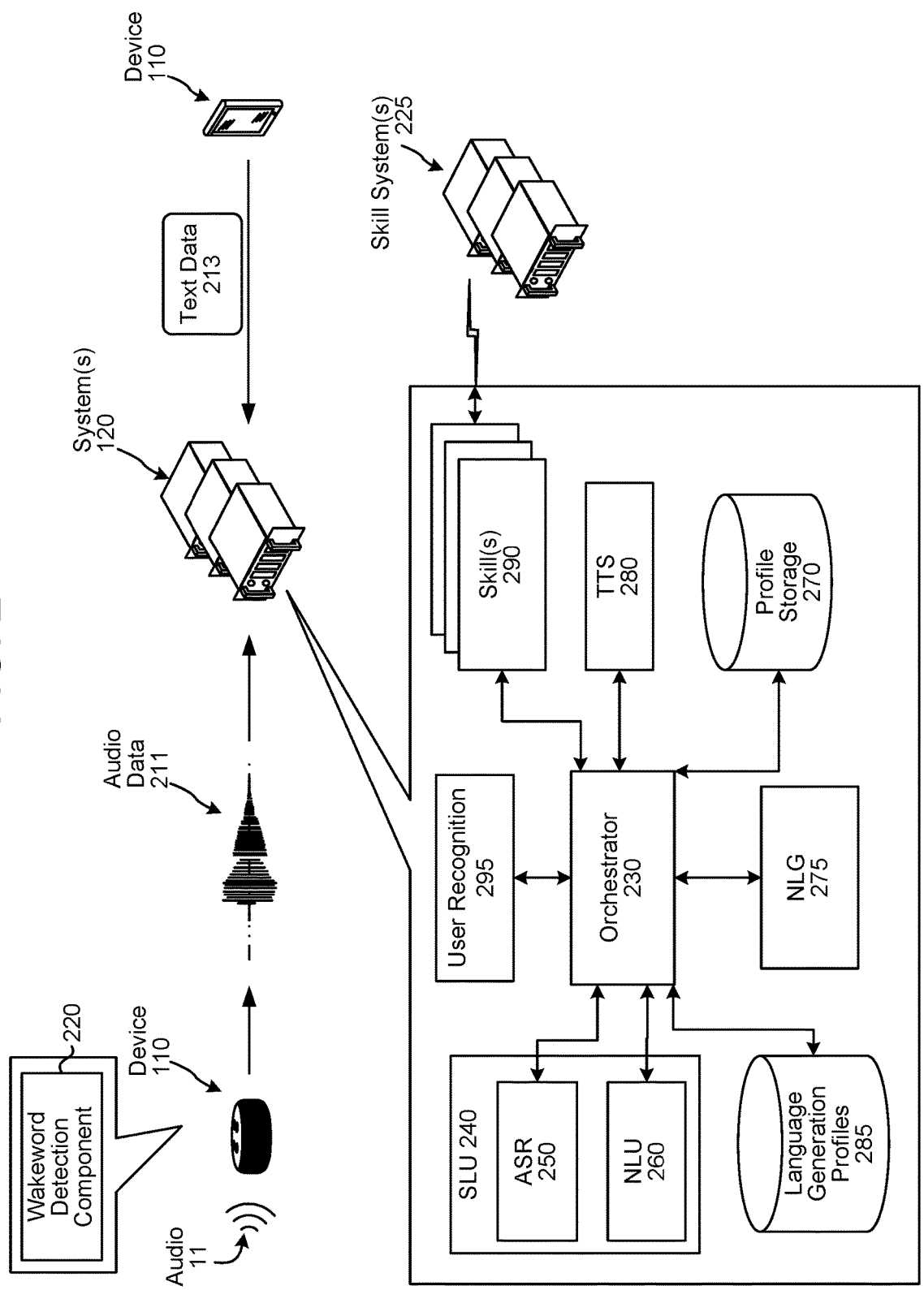
FIG. 2 is a conceptual diagram of components of a system according to embodiments of the present disclosure.

The system may operate using various components as illustrated in FIG. 2. The various components may be located on the same or different physical devices. Communication between various components may occur directly or across a network(s) 199.

An audio capture component(s), such as a microphone or array of microphones of a device 110, captures audio 11. The device 110 processes audio data, representing the audio 11, to determine whether speech is detected. The device 110 may use various techniques to determine whether audio data includes speech. In some examples, the device 110 may apply voice activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the device 110 may implement a limited classifier configured to distinguish speech from background noise. The classifier may be implemented by techniques such as linear classifiers, support vector machines, and decision trees. In still other examples, the device 110 may apply Hidden Markov Model (HMM) or Gaussian Mixture Model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Once speech is detected in audio data representing the audio 11, the device 110 may use a wakeword detection component 220 to perform wakeword detection to determine when a user intends to speak an input to the device 110. An example wakeword is "Alexa."

Wakeword detection is typically performed without performing linguistic analysis, textual analysis, or semantic analysis. Instead, the audio data, representing the audio 11, is analyzed to determine if specific characteristics of the audio data match preconfigured acoustic waveforms, audio signatures, or other data to determine if the audio data "matches" stored audio data corresponding to a wakeword.

Thus, the wakeword detection component 220 may compare audio data to stored models or data to detect a wakeword. One approach for wakeword detection applies general large vocabulary continuous speech recognition (LVCSR) systems to decode audio signals, with wakeword searching being conducted in the resulting lattices or confusion networks. LVCSR decoding may require relatively high computational resources. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 220 may be built on deep neural network (DNN)/recursive neural network (RNN) structures directly, without HMM being involved. Such an architecture may estimate the posteriors of wakewords with context information, either by stacking frames within a context window for DNN, or using RNN. Follow-on posterior threshold tuning or smoothing is applied for decision making. Other techniques for wakeword detection, such as those known in the art, may also be used.

In various embodiments, the device 110 may behave differently depending on which wakeword is used. For example, in a multi-user environment, different users may use different wakewords, and the device 110 may tailor its operation in response to a particular user/wakeword matching. The device 110 may, for example, access a user profile associated with a particular wakeword and load device preferences or device usage history stored in the user profile. In other embodiments, a first wakeword may be associated with a first mode of operation of the device 110 and a second wakeword may be associated with a second mode of operation of the device 110. The first mode of operation may be, for example, a personal assistant, and the second mode of operation may be navigation (such as automobile navigation).

In another example the device 110 may be configured to process commands associated with a first wakeword using a different set of components than commands associated with a second wakeword. For example, if an utterance includes the wakeword "Alexa," audio data for that wakeword may be sent to a first speech processing system for speech processing and/or command execution. If an utterance includes the wakeword "Ok Google," audio data for that wakeword may be sent to a second speech processing system for speech processing and/or command execution. In another example the system may also use different wakewords for different skills within a same speech processing system. For example, a user may speak "Ford" as a special wakeword to invoke a specific skill or processing pipeline within a first speech processing system (e.g., a speech processing system that may otherwise be invoked by speaking "Alexa"). Use of the special "Ford" wakeword may result in different routing of the utterance through the first speech processing system than use of a standard wakeword such as "Alexa." Thus the device 110 using the techniques described herein may process incoming audio to determine a first confidence that a detected wakeword is a first wakeword associated with a first speech processing pipeline (which may be a first speech processing system or a first pipeline (e.g., skill, etc.) within the first speech processing system) as well as determine a second confidence that the detected wakeword is a second wakeword associated with a second speech processing pipeline (which may be a second speech processing system or a second, different, pipeline (e.g., skill, etc.) within the second speech processing system. The different systems/pipelines may be associated with different ASR processing, different NLU processing, different commands/intents, or other differences.

Once the wakeword is detected, the device 110 may "wake" and begin transmitting audio data 211, representing the audio 11, to the system(s) 120. The audio data 211 may include data corresponding to the wakeword, or the portion of the audio corresponding to the wakeword may be removed by the device 110 prior to sending the audio data 211 to the system(s) 120.

Upon receipt by the system(s) 120, the audio data 211 may be sent to an orchestrator component 230. The orchestrator component 230 may include memory and logic that enables the orchestrator component 230 to transmit various pieces and forms of data to various components of the system, as well as perform other operations as described herein.

The orchestrator component 230 sends the input audio data 211 to a spoken language understanding (SLU) component 240. The SLU component 240 performs SLU processing on the input audio data 211 using an ASR component 250 and a NLU component 260. The ASR component 250 that transcribes the input audio data 211 into input text data representing one more hypotheses representing speech contained in the input audio data 211. The text data output by the ASR component 250 may thus represent one or more than one (e.g., in the form of an N-best list) ASR hypotheses representing speech represented in the audio data 211. The ASR component 250 interprets the speech in the audio data 211 based on a similarity between the audio data 211 and pre-established language models. For example, the ASR component 250 may compare the audio data 211 with models for sounds (e.g., subword units, such as phonemes, etc.) and sequences of sounds to identify words that match the sequence of sounds of the speech represented in the audio data 211. The ASR component 250 outputs text data representing one or more ASR hypotheses. The ASR component 250 may also output respective scores for the one or more ASR hypotheses. Such text data and scores may be output, for example, following language model operations by the ASR component 250. Thus the text data output by the ASR component 250 may include a top scoring ASR hypothesis or may include an N-best list of ASR hypotheses. An N-best list may additionally include a respective score associated with each ASR hypothesis represented therein. Each score may indicate a confidence of ASR processing performed to generate the ASR hypothesis with which the score is associated. Further details of the ASR processing are included below.

The device 110 may send text data 213 to the system(s) 120. Upon receipt by the systems(s) 120, the text data 213 may be sent to the orchestrator component 230, which may send the text data 213 to the NLU component 260. The text data 213 may be derived from an input(s) provided by the user 5 via an application/app on the device 110. The text data 213, for example, may be "how tall is President <XYZ>."

The NLU component 260 receives the ASR hypothesis/hypotheses (i.e., text data) attempts to make a semantic interpretation of the phrase(s) or statement(s) represented therein. That is, the NLU component 260 determines one or more meanings associated with the phrase(s) or statement(s) represented in the text data based on words represented in the text data. The NLU component 260 determines an intent representing an action that a user desires be performed as well as pieces of the text data that allow a device (e.g., the device 110, the system(s) 120, a skill 290, a skill system(s) 225, etc.) to execute the intent. For example, if the text data corresponds to "play Adele music," the NLU component 260 may determine an intent that the system(s) 120 output music and may identify "Adele" as an artist. For further example, if the text data corresponds to "what is the weather," the NLU component 260 may determine an intent that the system(s) 120 output weather information associated with a geographic location of the device 110. In another example, if the text data corresponds to "turn off the lights," the NLU component 260 may determine an intent that the system(s) 120 turn off lights associated with the device(s) 110 or the user(s) 5.

The NLU component 260 may send NLU results data (which may include tagged text data, indicators of intent, etc.) to the orchestrator component 230. The orchestrator component 230 may send the NLU results data to a skill(s) 290. If the NLU results data includes a single NLU hypothesis, the orchestrator component 230 may send the NLU results data to the skill(s) 290 associated with the NLU hypothesis. If the NLU results data includes an N-best list of NLU hypotheses, the orchestrator component 230 may send the top scoring NLU hypothesis to a skill(s) 290 associated with the top scoring NLU hypothesis.

A "skill" may be software running on the system(s) 120 that is akin to a software application running on a traditional computing device. That is, a skill 290 may enable the system(s) 120 to execute specific functionality in order to provide data or produce some other requested output. The system(s) 120 may be configured with more than one skill 290. For example, a weather service skill may enable the system(s) 120 to provide weather information, a car service skill may enable the system(s) 120 to book a trip with respect to a taxi or ride sharing service, a restaurant skill may enable the system(s) 120 to order a pizza with respect to the restaurant's online ordering system, etc. A skill 290 may operate in conjunction between the system(s) 120 and other devices, such as the device 110, in order to complete certain functions. Inputs to a skill 290 may come from speech processing interactions or through other interactions or input sources. A skill 290 may include hardware, software, firmware, or the like that may be dedicated to a particular skill 290 or shared among different skills 290.

In addition or alternatively to being implemented by the system(s) 120, a skill 290 may be implemented by a skill system(s) 225. Such may enable a skill system(s) 225 to execute specific functionality in order to provide data or perform some other action requested by a user.

Types of skills include home automation skills (e.g., skills that enable a user to control home devices such as lights, door locks, cameras, thermostats, etc.), entertainment device skills (e.g., skills that enable a user to control entertainment devices such as smart televisions), video skills, flash briefing skills, as well as custom skills that are not associated with any pre-configured type of skill.

The system(s) 120 may be configured with a single skill 290 dedicated to interacting with more than one skill system 225.

Unless expressly stated otherwise, reference to a skill, skill device, or skill component may include a skill 290 operated by the system(s) 120 and/or skill operated by the skill system(s) 225. Moreover, the functionality described herein as a skill may be referred to using many different terms, such as an action, bot, app, or the like.

A skill 290/skill system 225 may include a natural language generation (NLG) component that is particularly configured to generate a natural language output responsive to a user input. The natural language output may be structured data used to generate synthesized speech or other forms of output to present to the user 5. The natural language output generated by the skill 290 may be referred to as the default/generic output responsive to the user input. The natural language output generated by the skill 290 may be provided to the NLG component 275 for further processing, for example, for applying a selected language generation profile as described below in detail.

The system(s) 120 may include a TTS component 280 that generates audio data (e.g., synthesized speech) from text data using one or more different methods. Text data input to the TTS component 280 may come from a skill 290, the orchestrator component 230, or another component of the system(s) 120.

In one method of synthesis called unit selection, the TTS component 280 matches text data against a database of recorded speech. The TTS component 280 selects matching units of recorded speech and concatenates the units together to form audio data. In another method of synthesis called parametric synthesis, the TTS component 280 varies parameters such as frequency, volume, and noise to create audio data including an artificial speech waveform. Parametric synthesis uses a computerized voice generator, sometimes called a vocoder.

The system(s) 120 may include profile storage 270. The profile storage 270 may include a variety of information related to individual users, groups of users, devices, etc. that interact with the system(s) 120. A "profile" refers to a set of data associated with a user, device, etc. The data of a profile may include preferences specific to the user, device, etc.; input and output capabilities of the device; internet connectivity information; user bibliographic information; subscription information; as well as other information.

The profile storage 270 may include one or more user profiles, with each user profile being associated with a different user identifier. Each user profile may include various user identifying information. Each user profile may also include preferences of the user and/or one or more device identifiers, representing one or more devices registered to the user.

The profile storage 270 may include one or more group profiles. Each group profile may be associated with a different group profile identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, each user profile may include preferences unique from one or more other user profiles associated with the same group profile. A user profile may be a stand-alone profile or may be associated with a group profile. A group profile may include one or more device profiles representing one or more devices associated with the group profile.

The profile storage 270 may include one or more device profiles. Each device profile may be associated with a different device identifier. Each device profile may include various device identifying information. Each device profile may also include one or more user identifiers, representing one or more user profiles associated with the device profile. For example, a household device's profile may include the user identifiers of users of the household.

The user recognition component 295 may recognize one or more users using various data. The user recognition component 295 may take as input the audio data 211 or other forms of input provided by the user 5. The user recognition component 295 may perform user recognition by comparing speech characteristics, in the audio data 211, to stored speech characteristics of users. The user recognition component 295 may additionally or alternatively perform user recognition by comparing biometric data (e.g., fingerprint data, iris data, etc.), received by the system(s) 120 in correlation with a natural language input, to stored biometric data of users. The user recognition component 295 may additionally or alternatively perform user recognition by comparing image data (e.g., including a representation of at least a feature of a user), received by the system(s) 120 in correlation with a natural language input, with stored image data including representations of features of different users. The user recognition component 295 may perform other or additional user recognition processes, including those known in the art. For a particular natural language input, the user recognition component 295 may perform processing with respect to stored data of users associated with the device 110 that captured the natural language input.

The user recognition component 295 determines whether a natural language input originated from a particular user. For example, the user recognition component 295 may generate a first value representing a likelihood that a natural language input originated from a first user, a second value representing a likelihood that the natural language input originated from a second user, etc. The user recognition component 295 may also determine an overall confidence regarding the accuracy of user recognition operations.

The user recognition component 295 may output a single user identifier corresponding to the most likely user that originated the natural language input. Alternatively, the user recognition component 295 may output multiple user identifiers (e.g., in the form of an N-best list) with respective values representing likelihoods of respective users originating the natural language input. The output of the user recognition component 295 may be used to inform NLU processing, processing performed by a skill system(s) 125, as well as processing performed by other components of the system(s) 120 and/or other systems.

The system may be configured to incorporate user permissions and may only perform activities disclosed herein if approved by a user. As such, the systems, devices, components, and techniques described herein would be typically configured to restrict processing where appropriate and only process user information in a manner that ensures compliance with all appropriate laws, regulations, standards, and the like. The system and techniques can be implemented on a geographic basis to ensure compliance with laws in various jurisdictions and entities in which the components of the system and/or user are located.

Figure 3:
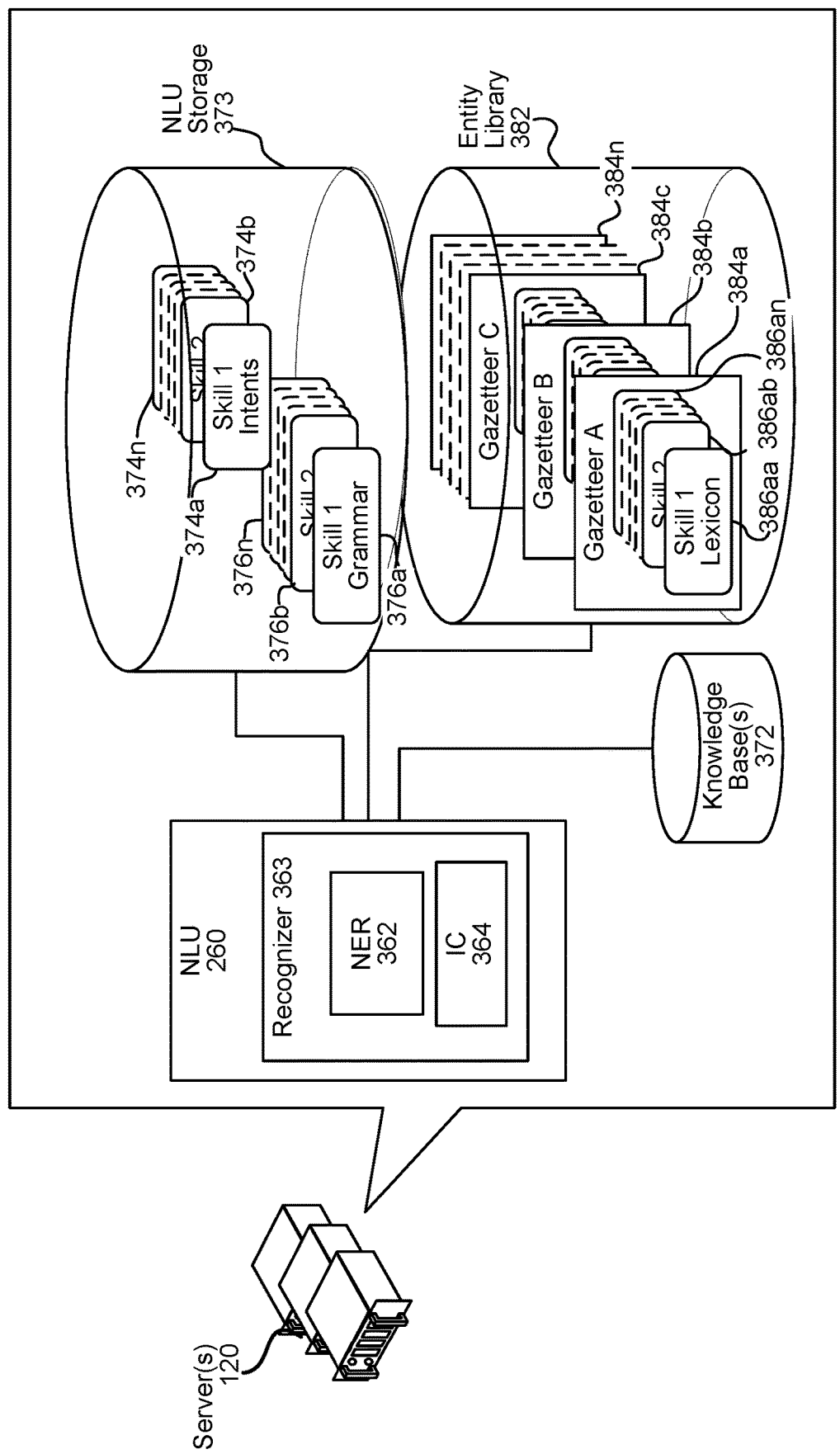
FIG. 3 is a conceptual diagram illustrating how natural language understanding processing is performed according to embodiments of the present disclosure.

FIG. 3 illustrates how NLU processing is performed on text data. Generally, the NLU component 260 attempts to make a semantic interpretation of text data input thereto. That is, the NLU component 260 determines the meaning behind text data based on the individual words and/or phrases represented therein. The NLU component 260 interprets text data to derive an intent of the user as well as pieces of the text data that allow a device (e.g., the device 110, the system(s) 120, skill system(s) 225, etc.) to complete that action.

The NLU component 260 may process text data including several ASR hypotheses. The NLU component 260 may process all (or a portion of) the ASR hypotheses input therein. Even though the ASR component 250 may output multiple ASR hypotheses, the NLU component 260 may be configured to only process with respect to the top scoring ASR hypothesis.

The NLU component 260 may include one or more recognizers 363. Each recognizer 363 may be associated with a different domain (e.g., smart home, video, music, weather, custom, etc.). Each recognizer 363 may process with respect to text data input to the NLU component 260. Each recognizer 363 may operate at least partially in parallel with other recognizers 363 of the NLU component 260.

Each recognizer 363 may include a named entity recognition (NER) component 362. The NER component 362 attempts to identify grammars and lexical information that may be used to construe meaning with respect to text data input therein. The NER component 362 identifies portions of text data that correspond to a named entity that may be applicable to processing performed by a domain. The NER component 362 (or other component of the NLU component 260) may also determine whether a word refers to an entity whose identity is not explicitly mentioned in the text data, for example "him," "her," "it" or other anaphora, exophora or the like.

Each recognizer 363, and more specifically each NER component 362, may be associated with a particular grammar model and/or database 373, a particular set of intents/actions 374, and a particular personalized lexicon 386. Each gazetteer 384 may include skill-indexed lexical information associated with a particular user and/or device 110. For example, a Gazetteer A (384a) includes skill-indexed lexical information 386aa to 386an. A user's music skill lexical information might include album titles, artist names, and song names, for example, whereas a user's contact list skill lexical information might include the names of contacts. Since every user's music collection and contact list is presumably different, this personalized information improves entity resolution.

An NER component 362 applies grammar models 376 and lexical information 386 to determine a mention of one or more entities in text data. In this manner, the NER component 362 identifies "slots" (corresponding to one or more particular words in text data) that may be used for later processing. The NER component 362 may also label each slot with a type (e.g., noun, place, city, artist name, song name, sender name, recipient name, entity name, sports team name, sporting event, weather condition, prescription name, etc.).

Each grammar model 376 includes the names of entities (i.e., nouns) commonly found in speech about the particular domain to which the grammar model 376 relates, whereas the lexical information 386 is personalized to the user and/or the device 110 from which the user input originated. For example, a grammar model 376 associated with a shopping domain may include a database of words commonly used when people discuss shopping.

Each recognizer 363 may also include an intent classification (IC) component 364. An IC component 364 parses text data to determine an intent(s). An intent represents an action a user desires be performed. An IC component 364 may communicate with a database 374 of words linked to intents. For example, a music intent database may link words and phrases such as "quiet," "volume off," and "mute" to a <Mute> intent. An IC component 364 identifies potential intents by comparing words and phrases in text data to the words and phrases in an intents database 374.

The intents identifiable by a specific IC component 364 are linked to domain-specific grammar frameworks 376 with "slots" to be filled. Each slot of a grammar framework 376 corresponds to a portion of text data that the system believes corresponds to an entity. For example, a grammar framework 376 corresponding to a <PlayMusic> intent may correspond to sentence structures such as "Play {Artist Name}," "Play {Album Name}," "Play {Song name}," "Play {Song name} by {Artist Name}," etc. For example, a grammar framework 376 corresponding to a <TellMeWhen> intent may correspond to sentence structures such as "Remind me of {TriggerEvent}," "Notify me of {TriggerEvent}," "Remind me of {TriggerEvent} by {Action}," "Notify me of {TriggerEvent} by {Action}," etc. However, to make resolution more flexible, grammar frameworks 376 may not be structured as sentences, but rather based on associating slots with grammatical tags.

For example, an NER component 362 may parse text data to identify words as subject, object, verb, preposition, etc. based on grammar rules and/or models prior to recognizing named entities in the text data. An IC component 364 (e.g., implemented by the same recognizer 363 as the NER component 362) may use the identified verb to identify an intent. The NER component 362 may then determine a grammar model 376 associated with the identified intent. For example, a grammar model 376 for an intent corresponding to <PlayMusic> may specify a list of slots applicable to play the identified "object" and any object modifier (e.g., a prepositional phrase), such as {Artist Name}, {Album Name}, {Song name}, etc. For example, a grammar model 376 for an intent corresponding to <TellMeWhen> may specify a list of slots applicable to notify the user when the identified "event" occurs (e.g., receipt of email, prescription is ready, a particular weather condition, etc.) and any event modifiers, such as {Email Sender}, {Prescription Name}, {Rain}, etc. The NER component 362 may then search corresponding fields in a lexicon 386, attempting to match words and phrases in text data the NER component 362 previously tagged as a grammatical object or object modifier with those identified in the lexicon 386.

An NER component 362 may perform semantic tagging, which is the labeling of a word or combination of words according to their type/semantic meaning. An NER component 362 may parse text data using heuristic grammar rules, or a model may be constructed using techniques such as hidden Markov models, maximum entropy models, log linear models, conditional random fields (CRF), and the like. For example, an NER component 362 implemented by a music recognizer may parse and tag text data corresponding to "play mother's little helper by the rolling stones" as {Verb}: "Play," {Object}: "mother's little helper," {Object Preposition}: "by," and {Object Modifier}: "the rolling stones." The NER component 362 identifies "Play" as a verb, which an IC component 364 may determine corresponds to a <PlayMusic> intent. At this stage, no determination has been made as to the meaning of "mother's little helper" and "the rolling stones," but based on grammar rules and models, the NER component 362 has determined the text of these phrases relates to the grammatical object (i.e., entity) of the user input represented in the text data.

The frameworks linked to the intent are then used to determine what database fields should be searched to determine the meaning of these phrases, such as searching a user's gazetteer 384 for similarity with the framework slots. For example, a framework for a <PlayMusic> intent might indicate to attempt to resolve the identified object based on {Artist Name}, {Album Name}, and {Song name}, and another framework for the same intent might indicate to attempt to resolve the object modifier based on {Artist Name}, and resolve the object based on {Album Name} and {Song Name} linked to the identified {Artist Name}. If the search of the gazetteer 384 does not resolve a slot/field using gazetteer information, the NER component 362 may search a database of generic words (e.g., in the knowledge base 372). For example, if the text data includes "play songs by the rolling stones," after failing to determine an album name or song name called "songs" by "the rolling stones," the NER component 362 may search the database for the word "songs." In the alternative, generic words may be checked before the gazetteer information, or both may be tried, potentially producing two different results.

An NER component 362 may tag text data to attribute meaning thereto. For example, an NER component 362 may tag "play mother's little helper by the rolling stones" as: {domain} Music, {intent}<PlayMusic>, {artist name} rolling stones, {media type} SONG, and {song title} mother's little helper. For further example, the NER component 362 may tag "play songs by the rolling stones" as: {domain} Music, {intent}<PlayMusic>, {artist name} rolling stones, and {media type} SONG.

The NLG component 275 is configured to determine a natural language output using values and other response data provided by the skill component 290 in response to processing the user input. The NLG component 275, as described below, may select a language generation profile to be used in generating the natural language output.

In some embodiments, a user (e.g., skill/application developer, administrator, etc.) can provide information to setup a language generation profile, where the information specifies the attributes to be used in generating a natural language output. The provided information may be stored in the language generation profile storage 285. As such, language generation profiles are configurable/customizable by various users to output a natural language output using different styles. For example, a manager/admin for a business may set up a language generation profile according to a character(s)/personality(ies) or items/services associated with the business, and when a user (e.g., user 5) interacts with a device 110 that is located within the business resort/hotel, the natural language output is generated using the particular language generation profile to provide an immersive/more engaging experience for the user.

In some embodiments, the orchestrator 230 or other components shown in FIG. 2 (e.g., the NLU component 260 or the skill(s) component 290) may select a language generation profile from the storage 285 to be used to generate a natural language output to a user input. Such selection may be made using the techniques and data described below with respect to FIGS. 4 and 5 and the NLG component 275.

In some embodiments, one or more components of the system(s) 120 can be included in the device 110. For example, the SLU component 240 may be included in the device 110 and the device 110 may perform ASR processing and NLU processing on the user input. Similarly, the device 110 may include and execute the user recognition component 295 to perform user recognition as described above. In yet another example, the device 110 may include the NLG component 275 and/or the TTS component 280, and the device 110 may, using the components 275 and 280, determine a natural language output to a user input and/or synthesized speech output to a user input, as described herein.

Figure 4:
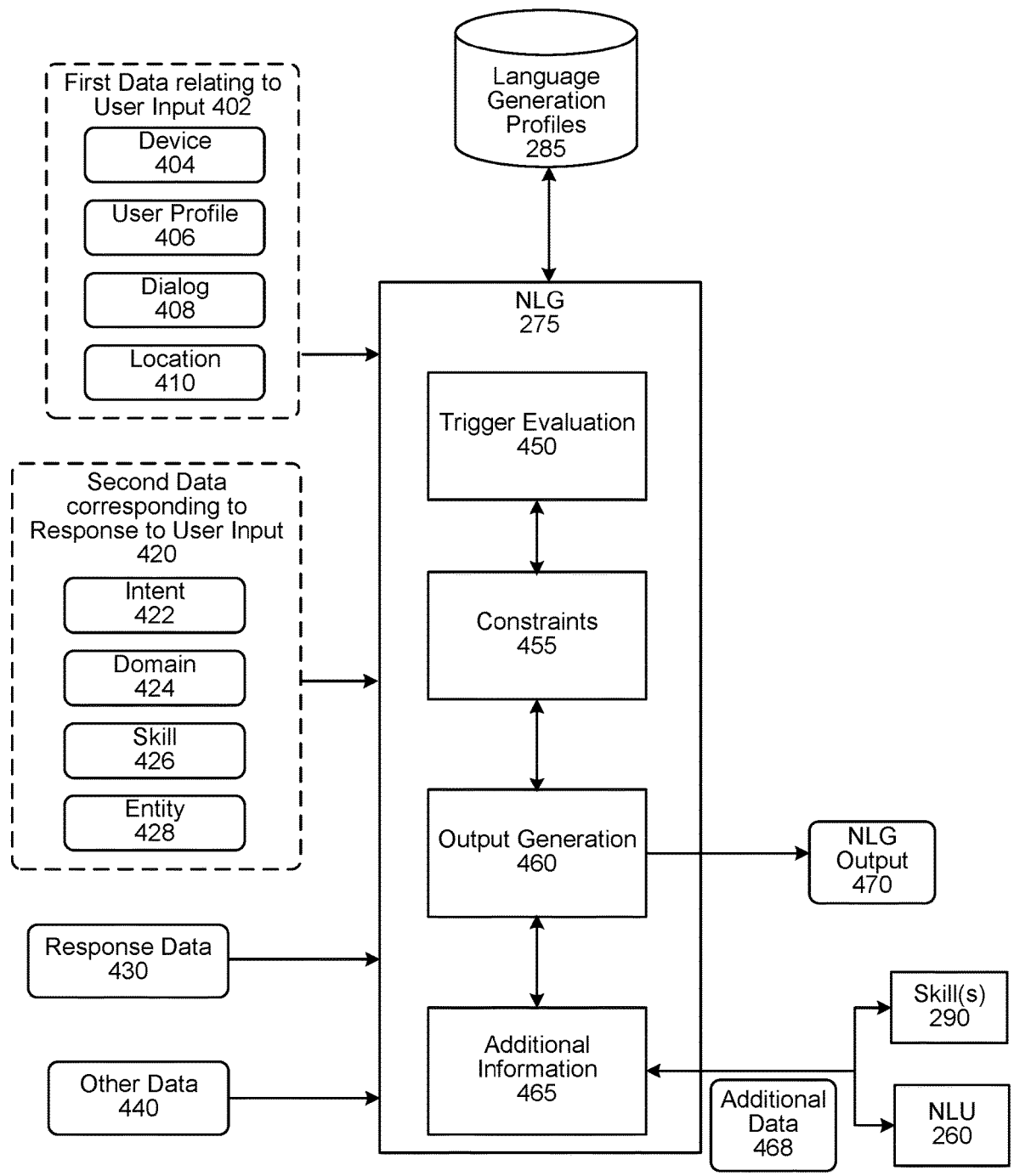
FIG. 4 is a conceptual diagram of a natural language generation component according to embodiments of the present disclosure.

Referring to FIG. 4, the NLG component 275 may include a trigger evaluation component 450, a constraints component 455, an output generation component 460, and an additional information component 465. The NLG component 275 may receive as input and process first data 402 relating to a user input and second data 420 corresponding to a response to the user input. The NLG component 275 may directly receive data from the language generation profiles storage 285, or may receive data from the language generation profile storages 285 via the orchestrator 230.

The NLG component 275 is configured to determine a natural language output based on values and response data provided by another component (e.g., skill component 290). In determining the natural language output, the NLG component 275 of the present disclosure may also determine to use/apply a particular language generation profile. The language generation profile 502 may include attributes that differ from a general/default language generation profile that may be used to respond to user inputs. For example, the system(s) 120 may use a first voice as a default language generation profile, while the NLG component 275 of the present disclosure may apply a particular language generation profile, for example, that causes the system(s) 120 to respond in a second voice (e.g., corresponding to how a pirate or other character, celebrity, personality, etc.) may respond to user inputs.

The NLG component 275, in particular, the trigger evaluation component 450 may process the first data 402 and the second data 420 to determine which language generation profile (from the language generation profiles 285) is to be used while generating a natural language output responsive to the user input. The trigger evaluation component 450 may include a rule-based engine that evaluates the various data inputs (the first data 402, the second data 420, the response data 430 and the other data 440) to determine whether a language generation profile should be applied/used and which language generation profile (e.g., a language generation profile 502 stored at the language generation profiles storage 285) should be used. In some embodiments, the trigger evaluation component 450 may include a machine-learning model (e.g., a neural network, a classifier, probabilistic graph, etc.) that evaluates the various data inputs (the first data 402, the second data 420, the response data 430 and the other data 440) to determine whether a language generation profile should be applied/used and which language generation profile 502 stored at the language generation profiles storage 285 should be used. In some embodiments, the trigger evaluation component 450 may include a self-learning policy engine that may use reward-based reinforcement learning to determine whether a language generation profile should be applied/used and which language generation profile 502 stored at the language generation profiles storage 285 should be used.

The first data 402 may include device data 404 representing information relating to a device 110 that received/captured the user input. The device data 404 may include a device identifier associated with the device 110, a device type of the device 110, device profile data associated with the device 110, and the like. The device profile data may indicate an organization that owns (or is otherwise associated with) the device 110. The device profile data may indicate that a particular language generation profile (a language generation profile identifier) from the language generation profiles 285 is to be used in responding to user inputs captured by the device 110. The trigger evaluation component 450 may determine that a language generation profile 502 is to be used in generating the natural language output to the user input based on the device data 404. For example, if the device type indicates that the device 110 is specifically configured/designed for use by a child, then the trigger evaluation component 450 may determine to use a child language generation profile 502 that presents outputs in a way a child speaks and/or a child may understand. In another example, if the device profile indicates that the device 110 is owned by a themed hotel (e.g., medieval themed hotel), then the trigger evaluation component 450 may determine to use a corresponding themed language generation profile (e.g., a medieval English language generation profile) to present outputs in a manner relevant to/corresponding to the themed hotel. In another example, if the user input is "Turn on the light" and the light to be turned on is a pirate light device type (has a base designed like a pirate, and is identified as "pirate" light in the user profile/device profile, etc.), then the NLG component 275 may determine to respond to the user input using a pirate language generation profile. A response to the user input in this case may be "Ahoy matey, the light is on." In another example, if the user input is "set my alarm for 7 am" and the alarm is a cartoon character alarm clock (has a base designed like the cartoon character, and is identified as such in the user profile/device profile, etc.), the NLG component 275 may determine to respond to the user input using a language generation profile corresponding to the cartoon character.

The first data 402 may include user profile data 406 representing information relating to the user 5 that provides the user input. The user profile data 406 may be retrieved from the profile storage 270 using a profile identifier associated with the user 5. The user profile data 406 may indicate user preferences, including but not limited to one or more language generation profiles (identifiers) to be used in generating natural language outputs responsive to user inputs of the user 5. The user profile data 406 may indicate that a first language generation profile 502a is to be used when a first user input/first type of user input is received, and a second language generation profile 502b is to be used when a second user input/second type of user input is received. The user profile data 406 may indicate that a first language generation profile 502a is to be used when a user input is received from a first device 110a associated with the user's 5 profile, and that a second language generation profile 502b is to be used when a user input is received from a second device 110b associated with the user's 5 profile. The user preferences may have been provided by the user 5 explicitly or may have been determined by the system(s) 120 based on past interactions between the user 5 and the system(s) 120/device 110. The user profile data 406 may also represent past interaction data relating to interactions between the user 5 and the system(s) 120 (using different devices 110 associated with the user profile). The user profile data 406 may also represent past interaction data relating to interactions between the user 5 and other systems (e.g., an online retail system), and may, as such, include purchase history information.

The first data 402 may include dialog data 408 corresponding to a dialog session associated with the user input. A user input and performance by the system of a corresponding action responsive to the user input, may be referred to as a dialog "turn." The system(s) 120 may associate a dialog session with multiple related turns corresponding to consecutive related user inputs. One user input may be considered related to a subsequent user input, thereby causing a single dialog session identifier to be associated with both user inputs, based on, for example, a length of time between receipt of the first user input and receipt of the subsequent user input, a length of time between performance of an action responsive to the first user input and receipt of the subsequent user input, and/or the substance of the user input or the device response. The system(s) 120 may use the dialog session identifier or other data to track the progress of the dialog to select system responses in a way that tracks the previous user-system exchanges, thus moving the dialog along in a manner that results in a desirable user experience.

The dialog data 408 may include first text data representing a previous instance of the user input and second text data representing the system-generated response to the previous instance of the user input. The dialog data 408 may include a language generation profile identifier associated with a language generation profile 502 that was used in generating the system-generated response to the user input. The dialog data 408 may additionally or alternatively include ASR data and/or NLU data corresponding to the user input as determined by the ASR component 250 and the NLU component 260, respectively. The dialog data 408 may additionally or alternatively include a skill 290 selected to respond to the user input. The dialog data 408 may additionally or alternatively include text data representing any user input and corresponding system-generated response prior to the current user input. As such, the dialog data 408 may be dialog history data corresponding to the dialog turns prior to the current user input for the current dialog session.

The trigger evaluation component 450 may determine to use a particular language generation profile 502 based on the dialog data 408. For example, if a first language generation profile 502a was used to generate a first natural language output to a first user input (received prior to the current user input), then the same first language generation profile 502a may be used to generate a second natural language output a second/current user input of the dialog session, so that the system(s) 120 is not switching between language generation profiles during the same dialog session.

The first data 402 may include location data 410 representing a location of the device 110 that captured the user input. The trigger evaluation component 450 may use a particular language generation profile 502 based on the device's/user's location. For example, a first language generation profile 502a may be used if the device 110/user 5 is located at a primary home, a second language generation profile 502b may be used if the device 110/user 5 is located at work, a third language generation profile 502c may be used if the device 110/user 5 is located at a vacation home, etc. Selection of the language generation profile 502 may be based on the device 110/user 5 being located at a primary residence of the user 5, a vacation home of the user 5, an office of the user 5, at or as part of a vehicle, a school or other educational institution, outdoors, indoors, etc. For example, if the user 5 is at home, then the trigger evaluation component 450 may select a pirate language generation profile in generating the natural language output, while if the user 5 is at work, the trigger evaluation component 450 may avoid using the pirate language generation profile.

The second data 420 may include intent data 422 representing an intent corresponding to the user input. The intent data 422 may be determined by the NLU component 260 as described above in relation to FIG. 3. The second data 420 may include domain data 424 representing a domain corresponding to the user input. The domain data 424 may be determined by the NLU component 260 as described above in relation to FIG. 3. Based on the intent data 422 and/or the domain data 424, the trigger evaluation component 450 may determine to select a language generation profile 502 to generate the natural language output. For example, for the user input "turn on the lights", the first intent data 422 may be <intent: turn_on>, and the trigger evaluation component 450 may use a butler language generation profile to output "The lights are on sir."

The second data 420 may include skill data 426 representing a skill selected to respond to the user input. The skill data 426 may be determined by the NLU component 260. The response data 430 may be provided by the selected skill 290. In some embodiments, the response data 430 may include values to be used to generate a natural language output to the user input. In other embodiments, the response data 430 may include a (default/generic) natural language output determined using a natural language generation component implemented at the skill 290. The skill data 426 may include a skill identifier associated with the selected skill, and based on the selected skill the trigger evaluation component 450 may determine to use a particular language generation profile in generating the natural language output. For example, if the selected skill corresponds to a particular movie, then a language generation profile corresponding to a character of the movie may be used.

In some embodiments, the skill data 426 may include a language generation profile identifier identifying a language generation profile 502 to be used in generating the natural language output. The skill data 426 may be provided by the selected skill 290 to indicate to the NLG component 275 which language generation profile 502 to use in generating the natural language output.

The second data 420 may include entity data 428 representing one or more entity types corresponding to the user input. The entity data 428 may be determined by the NLU component 260. The trigger evaluation component 450 may determine to use a language generation profile 502 based on the entity type corresponding to the user input. For example, if the user input corresponds to the entity type "farm animals," then a friendly language generation profile may be used. In another example, if the user input corresponds to the entity type "Presidents", then a language generation profile associated with one of the U.S. Presidents may be used.

The NLG component 275 processes response data 430 representing a response to the user input. The response data 430 may include one or more values and other information to be included in the natural language output presented to the user 5 in response to the user input. For example, if the user input is "how tall is President XYZ", the response data 430 may be "6 feet." As another example, if the user input is "what is the weather today?", the response data 430 may include the values: "sunny", "70 degrees" and "50 degrees." In some embodiments, the response data 430 may include a template for how the response is to be presented to the user 5. For example, for the user input "how tall is President XYZ?", the response data 430 may be "President XYZ is 6 feet tall," and for the user input "what is the weather today?", the response data 430 may be "It is sunny today, with a high of 70s and low of 50s."

The NLG component 275 may also process other data 440. The other data 440 may include emotion/sentiment data corresponding to the user input. Based on the emotion/sentiment exhibited by the user 5 while providing the user input, the NLG component 275 may use different language generation profiles 502 or may avoid using a language generation profile 502. For example, if the user is frustrated, then the NLG component 275 may not use a pirate language generation profile, and if the user is happy, then the NLG component 275 may use the pirate language generation profile.

The other data 440 may include data representing the user input, such as, text data, an ASR hypothesis, ASR token data corresponding to each word in the user input, and the like. Thus, the NLG component 275, in some embodiments, may consider the user input, in addition to the response data 430, in generating the natural language output.

The other data 440 may include event data representing occurrence of one or more events around the time/when the user input is received. In one example, the event data may indicate that a particular sporting event (e.g., the Superbowl) is broadcasting or will be broadcasted within a particular time period of when the user input is received by the system(s) 120. Based on such event data, the trigger evaluation component 450 may select a language generation profile corresponding to one of the teams/players participating in the sporting event. Additionally, the trigger evaluation component 450 may select the language generation profile corresponding to a particular team/player based on a team/player preference determined from the user profile data 406. For example, the sporting event may involve team 1 and team 2, the trigger evaluation component 450 may determine that the user 5 is a fan of team 1 (using the user profile data 406), and may select a language generation component corresponding to the team 1, such that the natural language output to the user input may include positive cheering when the response relates to the team 1. In another example, the event data may indicate that it is a particular holiday, for example, Christmas, and the trigger evaluation component 450 may select a language generation profile corresponding to a personality/figure associated with the holiday, for example, Santa Claus. In this example, the language generation profile may indicate to insert "ho ho" in the natural language output.

The constraints component 455 may process the first data 402, the second data 420, the response data 430 and/or the other data 440 to perform a check on whether a language generation profile 502 should be used in generating a natural language output to the user input. Based on processing of the various data and additional data described below by the constraints component 455, the NLG component 275 may determine to disregard, ignore or otherwise not use/apply a language generation profile 502 determined by the trigger evaluation component 450 to be used in generating the natural language output.

The constraints component 455 may process the response data 430 (and/or other data 440 including a representation of the user input, second data 420) to determine a topic category/subject matter category corresponding to the user input and/or the response. Based on the topic category, the constraints component 455 may determine to disregard the language generation profile 502. If the topic of the user input/response relates to a particular topic (that may be included in a list/table), such as, health/medical information, then the constraints component 455 may determine to not apply a language generation profile 502 because a user may not want to receive health/medical information in a pirate language generation profile, for example. Example topic categories that the NLG component 275 may not apply language generation profiles 502 to include health/medical information (e.g., information from a doctor's office/hospital, prescription information, appointments, etc.), banking/financial information (e.g., account balance/updates, stock/investment account updates, bill due dates, etc.), severe weather alerts, news alerts (e.g., pandemic/epidemic related news/updates, Amber alerts, etc.), and the like.

In some embodiments, the constraints component 455 may override a language generation profile 502 selected by the trigger evaluation component 450 based on the topic category. For example, the trigger evaluation component 450 may select a first language generation profile 502a (e.g., a pirate language generation profile), and based on the topic category (e.g., severe weather alert) the constraints component 455 may select a second language generation profile 502b (e.g., news person language generation profile) to generate the natural language output.

The constraints component 455 may be configured to enforce certain rules or checks based on system policies and/or user-related data. The constraints component 455 may use feedback received from the user 5 in response to a previous output presented in response to a previous user input. The constraints component 455 may determine to blacklist certain system-responses, in particular use of a language generation profile 502, to the user 5 based on the user's feedback. The constraints component 455 may determine to blacklist certain system-responses for multiple users based on the user's feedback. The constraints component 455 may determine to blacklist certain system-responses for a period of time (e.g., for the duration of the current dialog session; the next 24 hours; the next week; the next 10 interactions; etc.) for a particular user 5 or for multiple users.

In some cases, the constraints component 455 may determine to disregard a language generation profile 502 based on user preferences and/or user profile data. For example, the user may have set preferences indicating that in certain situations/contexts (e.g., do-not-disturb mode, during evening/night hours, during work hours, etc.) the system should not use a particular language generation profile 502 or deviate from the usual/normal language generation profile that the user has set/selected.

In another example, if the user 5 asks the system(s) 120 to stop using a particular language generation profile (e.g., via a previous user input of the dialog session), then the constraints component 455 may determine to not use/disregard the language generation profile 502a used in responding to a previous user input of the dialog session.

The output generation component 460 may process the response data 430 to determine NLG output data 470. If a language generation profile 502 is to be used, then the output generation component 460 may identify one or more attributes associated with the language generation profile 502, and determine the NLG output data 470 using the attributes and the response data 430. The NLG output data 470 may include structured data representing the natural language output that can be processed by the TTS component 280 to generate synthesized speech corresponding to the natural language output.

The output generation component 460 may determine synthesized speech markup language (SSML) tags based on the attributes included in the language generation profile 502. SSML is a markup language that provides a standard way to mark up text data for generation of synthesized speech. The NLG output data 470 may be text data including at least a portion of the response data 430 and one or more SSML tags. Examples of how the language generation profile 502 can be used to determine SSML tag(s) and the NLG output data 470 are described below. The output generation component 460 may determine the NLG output data 470 using a natural language output template and the attributes of the selected language generation profile. For example, a natural language output template for a weather related response may be "It is <weather information>, with a high of <degrees> and low of <degrees>." The natural language output templates may be associated with particular intents, entity types/values, domain, skill, etc. The natural language output template may be used to determine a default/generic natural language output to the user input, and then the output generation component 460 may apply the attributes of the selected language generation profile to determine the NLG output data 470.

In some embodiments, the NLG component 275 may include the additional information component 465 that identifies when an output to a user input can benefit from additional information that was not included in the response data 430. The additional information component 465 may process the first data 402, the second data 420, the response data 430 and the other data 440 to determine that additional information can be included in the NLG output data 470. The additional information component 465 may request additional information corresponding to the user input and/or the response data 430 from other components of the system(s) 120. In some cases, the additional information component 465 may request the additional information from the skill(s) 290/skill system(s) 225 that provided the response data 430. In some cases, the additional information component 465 may request the additional information from the NLU component 260. In other embodiments, the additional information component 465 may request information from one or more knowledge base(s) that stores various information in a structured manner. The skill(s) component 290/skill system(s) 225 or the NLU component 260 may send additional data 468 to the additional information component 465. In some embodiments, the additional information component 465 may determine if the additional data 468 should be included in the NLG output data 470; if yes, then the additional information component 465 sends the additional data 468 to the output generation component 460.

Here is a non-limiting example illustrating when the additional information component 465 may request the additional data 468. The user input may be "what is the tallest mountain?" and the response data 430 provided by the skill component 290 may be "Mount Everest." The additional information component 465 may determine that information relating to the height of Mount Everest should be included in the natural language output, and requests the information (the height of Mount Everest) from the skill component 290. The additional data 468 provided by the skill component 290, in this case, may be "29,029 feet." Using the response data 430 and the additional data 468, the output generation component 460 may determine the NLG output data 470 to be "The tallest mountain is Mount Everest. It is 29,029 feet tall."

In some embodiments, the NLG component 275 may determine a natural language representation of additional/supplemental content that is not necessarily responsive to the user input, but may be related to the user input or the response to the user input. The NLG component 275 may select a language generation profile for the additional/supplemental content as described above. For example, the user input may be "what is the weather today?", the system(s) 120 may cause the device 110 to display the weather information indicating it is rainy, and output some synthesized speech representing additional/supplemental content, such as, "remember an umbrella." The NLG component 275 may select a language generation profile for such additional/supplemental content.

The language generation profile 502 may be associated with a language generation profile identifier (not shown) that may be an alphanumeric value uniquely identifying the language generation profile. The language generation profile 502 additionally or instead may be associated with a name uniquely identifying the language generation profile. For description purposes, certain language generation profiles are referred to by name herein, for example, a pirate language generation profile, a valley girl language generation profile, a movie/TV show character language generation profile, a cartoon character language generation profile, a celebrity language generation profile, a historic figure/person language generation profile, a news person/anchor profile, etc. It should be understood that the language generation profile name may indicate certain corresponding attributes that cause the system(s) 120 to output a natural language output that sounds like/feels like the particular person/personality.

Figure 5:
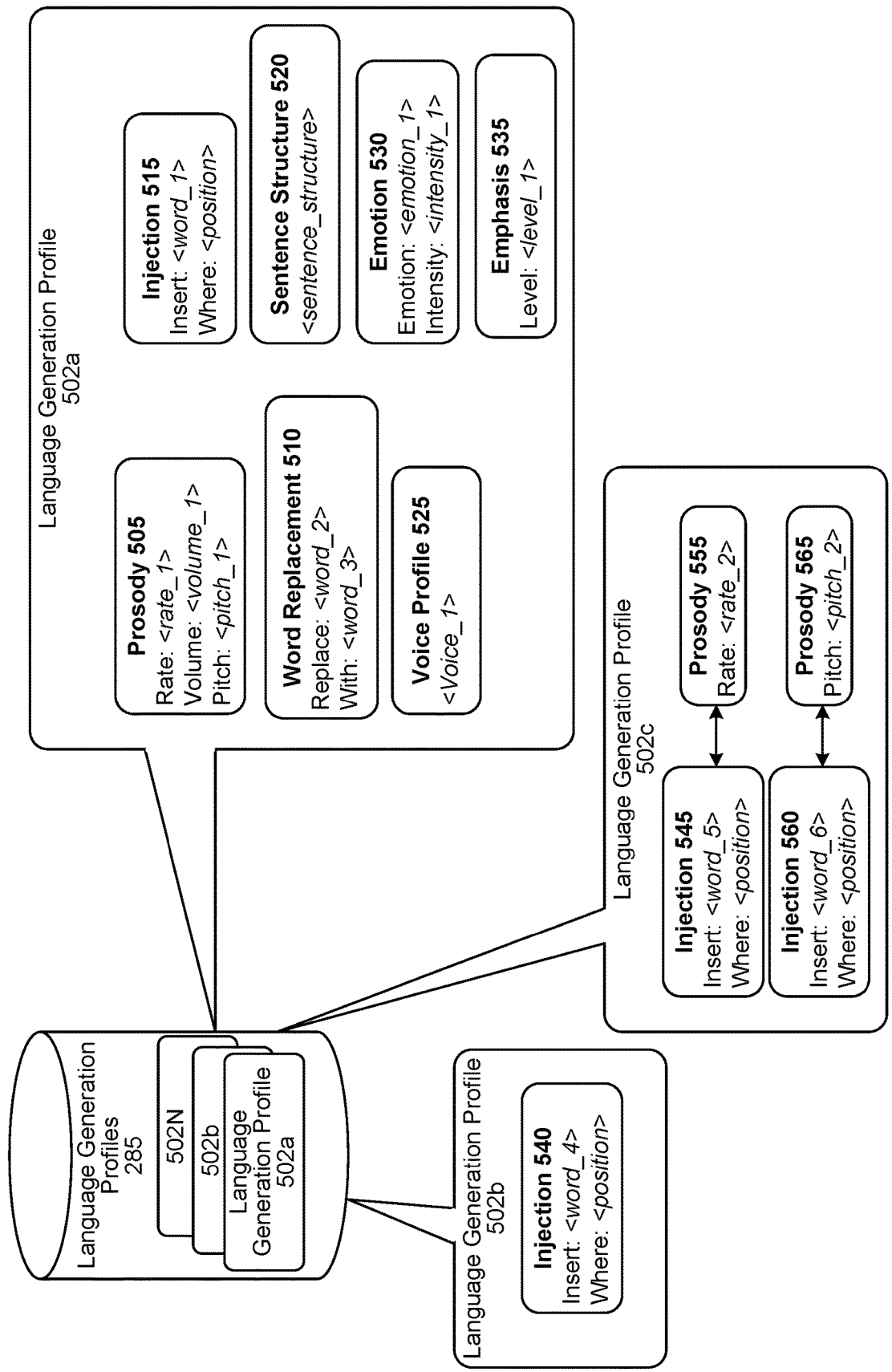
FIG. 5 is a conceptual diagram illustrating language generation profile data according to embodiments of the present disclosure.

As shown in FIG. 5, the language generation profile storage 285 may store language generation profile data corresponding to one or more language generation profiles 502 to be used to generate a natural language output to a user input. A language generation profile 502 may include data representing the various attribute values, such as but not limited to, prosody data 505, injection data 515, word replacement data 510, sentence structure data 520, emotion data 530, voice profile data 525, emphasis data 535, and the like. One or more of the attributes values may be referred to as word selection data. For example, at least the injection data 515, the word replacement data 510, and the sentence structure data 520 may be word selection data included in the language generation profile.

For example, as shown in FIG. 5, the language generation profile 502a may include the prosody data 505 specifying a rate value: <rate_1>, volume value: <volume_1> and a pitch value: <pitch_1>. The rate value may modify the rate of the speech. Example rate values are extra-slow, slow, medium, fast, and extra-fast. The rate value may also be a percentage value (n %) to increase or decrease the speech speed by the specified percentage. For example, 100% indicates no change from the normal rate, percentages greater than 100% increase the rate, and percentages below 100% decrease the rate.

The pitch value may raise or lower the tone/pitch of the speech. Example tone values are extra-low, low, medium, high, extra-high. The tone value may also be a percentage value (+n % or −n %) to increase or decrease the pitch by the specified percentage.

The volume value may change the volume of the speech. Example volume values are silent, extra-soft, soft, medium, loud, extra-loud. The volume value may also be a dB value (+ndB or −ndB) to increase or decrease the volume relative to the current volume. For example, +0 dB means no change of volume, +6 dB is approximately twice the current amplitude, and −6 dB means approximately half the current amplitude.

The word replacement data 510 includes a replace word value: <word 2>, which may be a string value representing the word(s)/phrase(s) that are to be replaced, a with value: <word_3>, which may be a string value representing the word(s)/phrase(s) that replace the <word_2>. For example, for a language generation profile corresponding to a Shakespearean-style, may include various word replacement data 510, as such, {replace word value: "here"; with value: "hither"} and {replace word value: "why"; with value: "wherefore"}. The word replacement data 510 can also represent replacement information at the letter/alphabet level, for example, using wild card(s) or asterisk(s). For example, {replace word value: "?s"; with value: "?th"} would cause the output generation component 460 to replace the "s" in a word ending in "s" with "th" (e.g., "has" in the generic natural language output is "hath" in the NLG output data 470). Thus the word replacement data 510 can be used to replace portions of a word within a natural language output.

The injection data 515 includes an insert value: <word_1>, which may be a string value representing the word(s)/phrase(s) to be inserted in the natural language output, and a position value:<position_1> may indicate where the <word_1> is to be inserted, for example, before the output, after the output, etc. For example, for a friendly language generation profile 502a, the injection data 515 may include [insert: "y'all"; where: after/at the end].

The sentence structure data 520 includes a value <sentence structure> indicating a structure for the sentence to be used in the natural language output. In some cases, the value may be "normal" or "default" indicating that a sentence structure of subject-verb-object is to be used. In other cases, the value may indicate the particular structure to use, for example, "object-subject-verb", which may be used for a Yoda language generation profile.

The voice profile data 525 includes a value <voice_1> representing a voice to be used in generating the synthesized speech. For example, the value may be "male", "female", "child", "Mickey Mouse," etc. In some embodiments, the system(s) 120 may support predefined voice profiles that may be identified using different names, such as, "Ivy", "Joey", "Kendra", "Matthew", etc. The voice profile may be associated with a particular accent (e.g., American English, British English, Australian English, etc.).

The emotion data 530 includes an emotion value: <emotion_1> that is to be applied to the speech at an intensity value: <intensity_1>, which represents the intensity or strength of the emotion to express. Example emotion values include excited, disappointed, happy, sad, etc., and example intensity values include low, medium and high.

The emphasis data 535 includes a level value: <level_1>. An emphasis value of "strong" increases the volume and slows down the speaking rate so the speech is louder and slower. An emphasis value of "moderate" increases the volume and slows down the speaking rate, but not as much as when set to strong. The moderate level may be used as a default if level is not provided. An emphasis value of "reduced" decreases the volume and speeds up the speaking rate, causing the speech to be softer and faster.

Using the above described attribute values, the output generation component 460 may determine SSML tags to include in the NLG output data. SSML tags are associated with a portion of the natural language output/speech that the particular attribute is to be applied to. The NLG output data may include tags such as {<SSML tag start> first portion of output <SSML tag end> second portion of output} or {<first SSML tag start> first portion of output <SSML tag end> <second SSML tag start> second portion of output <second SSML tag end>}. For example, the NLG output data may be {<emotion: "excited"> It is sunny today!<emotion> With a high of 70s.}, where "It is sunny today" is output in an excited manner/speech based on the start and end SSML tags associated with that portion of the output.

A language generation profile may include one or more attribute values described above, as shown with respect to the language generation profile 502b. A language generation profile may include a first attribute associated with a second attribute, as shown with respect to the language generation profile 502c.

In a non-limiting example, the language generation profile 502b may be a friendly language generation profile where "y'all" is added to an output. In this case, the injection data 540 may be {Insert: "y'all"; Where: at end}, and the output generation component 460 may generate the following NLG output data 470: {A cow eats hay <inject> y'all <inject>.}.

In another non-limiting example, the language generation profile 52c may be a valley girl language generation profile, where injection data 545 may be {Insert: "Oh my god!"; Where: at start} with prosody data 555 {Rate: fast}, and the injection data 560 may be {Insert: "Totally crazy!"; Where: at end} with prosody data 565 {Pitch: extra-high}. In this case, the output generation component 460 may generate the following NLG output data 470: {<injection> <prosody rate=fast> Oh my god!<injection> <prosody rate=fast> President XYZ is 6 feet tall. Which is like <injection> <prosody pitch=extra high> totally crazy!<injection> <prosody pitch=extra high>.}.

Although example outputs are described as being synthesized speech, it should be understood that a natural language output represented by the NLG output data 470 may be presented in other forms to the user, such as, by displaying the text on a screen, including the natural language output in a notification pushed to the user device or an email, text/SMS/MMS message sent the user device. For example, the device 110 may display the following text "Oh my god! President XYZ is 6 feet tall. Which is like totally crazy!".

Although the natural language output is described as being generated in response to a user input, it should be understood that the natural language output may be generated to provide a notification or reminder to the user. The user 5 may register to receive a notification or reminder when an event occurs, the system(s) 120 may determine when the notification or reminder is triggered using event data indicating occurrence of the event, and generate a natural language output notifying or reminding the user of the event. For example, the user 5 may provide the user input "Alexa, tell me when my order is ready for pickup", "tell me when I receive an email from Joe" or "remind me when the Seahawks game starts." When the specified events occur, the system(s) 120 may output "Your order is ready", "You have an email from Joe" or "The Seahawks game is going to start," respectively. The NLG component 275 of the present disclosure may use a language generation profile 502 in determining these outputs as described herein.

In an example embodiment, a knowledge base may be used to determine a response to the user input. The knowledge base(s) may include a collection of tuples or otherwise semantically (or otherwise) encoded data that can be queried to obtain information. For example a tuple such as [John Doe, husband of, Jane Doe] may describe that John Doe is Jane Doe's husband. Many such tuples may exist in a knowledge base and may be usable to answer incoming informational queries. For example, the above tuple may be used to answer a question such as "who is Jane Doe's husband," "who is John Doe married to" or the like.

The knowledge base(s) may additionally or alternatively store data in a form representative of a knowledge graph, which may comprise a directed acyclic graph (DAG) that graphs nodes representing entities (e.g., people, places, things) connected by vertices or links where each link corresponds to a relationship. To answer questions about particular entities in a knowledge graph, the system may traverse a path along the knowledge graph from one entity to another and track the information along the traversed links to obtain information about how one entity relates to another. For example, a DAG may include a node for Jane Doe, a node for John Doe, a node for Jake Doe, etc. A link between Jane Doe and John Doe may be associated with a variety of information such as "married in 2002," "met in 2000," etc. A link between John Doe and Jake Doe may be associated with information such as "brothers" or the like. Even if there is no direct link between the node for Jane Doe and the node for Jake Doe, the system may be able to determine a path between the two, and gather information along the vertices along that path (e.g., from Jane Doe to John Doe and then from John Doe to Jake Doe) to obtain information needed to answer the query "when did John Doe become the brother-in-law of Jane Doe."

The knowledge base(s) may also include a schema (for example defined by classes and properties) to organize its data. The knowledge base(s) may store data from various content sources. For example, the knowledge base(s) may store data from internet websites.

Figure 6:
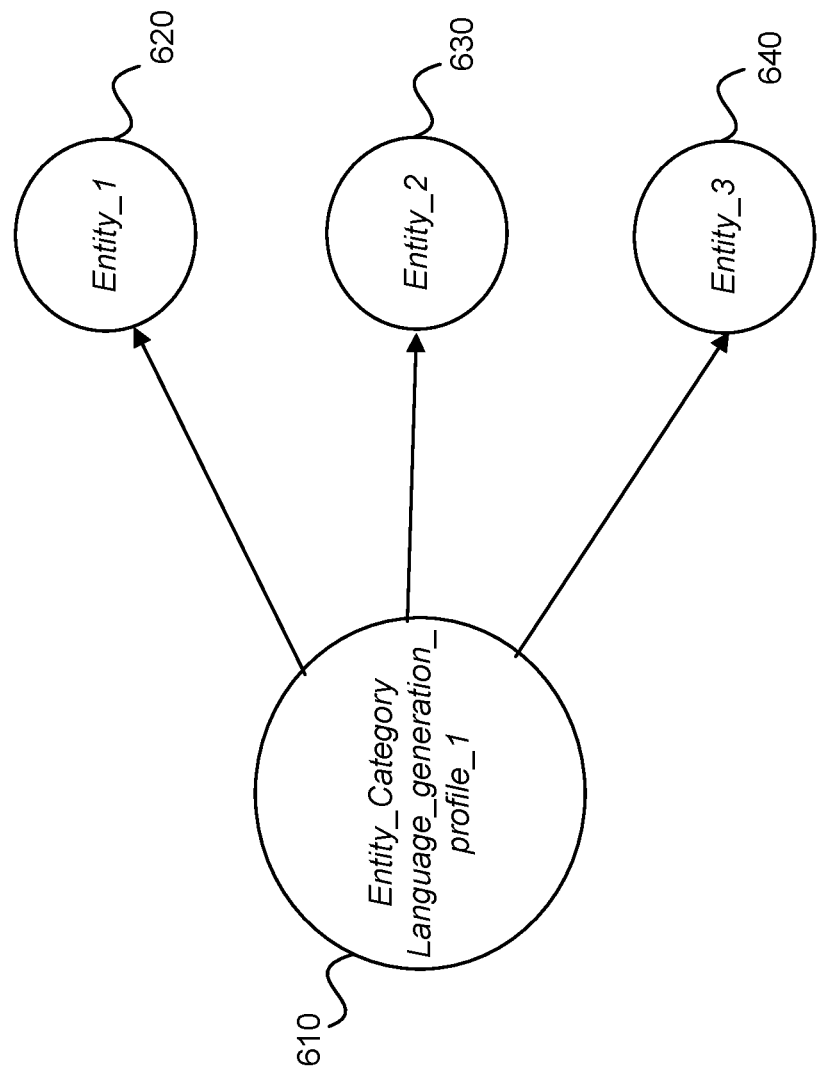
FIG. 6 is a schematic diagram of a knowledge base graph according to embodiments of the present disclosure.

FIG. 6 is a schematic diagram of a knowledge base graph according to embodiments of the present disclosure. In some embodiments, the knowledge base graph may include nodes representing different values and relationships to the values. The graph shown in FIG. 6, for example, represents entity values and relationships. The node 610 may correspond to a first entity category, and the child nodes 620, 630 and 640 may represent entities that correspond to the first entity category. In some embodiments, the first entity category node may be associated with a language generation profile identifier indicating which language generation profile 502, stored in the language generation profiles 285, to use in responding to a user input that maps to the first entity category. The NLG component 275 may use this information to select the language generation profile 502. In a non-limiting example, the node 610 may represent the entity category "farm animals," the language generation profile may be friendly language generation profile, the node 620 may represent the entity "cow", and the node 630 may represent "horse". For the user input "what do cows eat?", the NLG component 275 determines to output using the friendly language generation profile "cows eat grass, y'all". For the user input "what do horses eat?", the NLG component 275 determines to output using the friendly language generation profile "horses eat hay, y'all." If the language generation profile needs to be updated for the particular entity category, the data associating the language generation profile can be updated and the updated language generation profile will be used for all entities corresponding to the entity category.

One or more nodes in the knowledge base graph(s) may be associated with a natural language output template that may be the generic/default natural language output provided to the NLG component 275 for further processing. The NLG component 275 may apply a language generation profile to the generic natural language output received from the knowledge base graph to determine the NLG output data 470. For example, the node 620 may be {cows eat hay} and may be associated with the natural language output template "<A> cow<s> eat hay." In another example, the node 610 may be {President XYZ}, the node 620 may be {height=6 feet}, the node 630 may be {age=60 years}, etc. For the user input "how tall is President XYZ?", the nodes 610 and 620 may be traversed, and the associated natural language output template may be "President XYZ is 6 feet tall." Such natural language output templates may be inserted/provided to the knowledge base(s) by an administrator user who may update/store/program data for the knowledge base(s).

In some embodiments, the language generation profiles storage 285 may include a visual output profile that specifies one or more visual output forms to be used in responding to the user input. The visual output profile may indicate attributes such as lighting up the output device 110 (e.g., showing a blinking yellow light, a red ring light, etc. when the natural language output is presented to the user), causing the output device to vibrate, causing the device to include a sound (e.g., a chime, a chirp, etc.) along with the natural language output, displaying certain graphical elements on the device along with the natural language output (e.g., an emoticon, an image, etc.), and other visually perceptive outputs. The visual output profile may be associated with a particular language generation profile or may be included within a particular language generation profile.

One or more of the herein described system(s) 120 components may implement one or more trained machine learning models. Various machine learning techniques may be used to train and operate such models. Models may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply the machine learning techniques, the machine learning processes themselves need to be trained. Training a machine learning component such as, in this case, one of the trained models, requires establishing a "ground truth" for the training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

Neural networks may also be used to perform ASR processing including acoustic model processing and language model processing. In the case where an acoustic model uses a neural network, each node of the neural network input layer may represent an acoustic feature of a feature vector of acoustic features, such as those that may be output after the first pass of performing speech recognition, and each node of the output layer represents a score corresponding to a subword unit (such as a phone, triphone, etc.) and/or associated states that may correspond to the sound represented by the feature vector. For a given input to the neural network, it outputs a number of potential outputs each with an assigned score representing a probability that the particular output is the correct output given the particular input. The top scoring output of an acoustic model neural network may then be fed into an HMM which may determine transitions between sounds prior to passing the results to a language model.

In the case where a language model uses a neural network, each node of the neural network input layer may represent a previous word and each node of the output layer may represent a potential next word as determined by the trained neural network language model. As a language model may be configured as a recurrent neural network which incorporates some history of words processed by the neural network, the prediction of the potential next word may be based on previous words in an utterance and not just on the most recent word. The language model neural network may also output weighted predictions for the next word.

Processing by a neural network is determined by the learned weights on each node input and the structure of the network. Given a particular input, the neural network determines the output one layer at a time until the output layer of the entire network is calculated.

Connection weights may be initially learned by the neural network during training, where given inputs are associated with known outputs. In a set of training data, a variety of training examples are fed into the network. Each example typically sets the weights of the correct connections from input to output to 1 and gives all connections a weight of 0. In another embodiment, the initial connection weights are assigned randomly. As examples in the training data are processed by the neural network, an input may be sent to the network and compared with the associated output to determine how the network performance compares to the target performance. Using a training technique, such as back propagation, the weights of the neural network may be updated to reduce errors made by the neural network when processing the training data.

Components of a system that may be used to perform unit selection, parametric TTS processing, and/or model-based audio synthesis are shown in FIG. 7A. As shown in FIG. 7A, the TTS component/processor 280 may include a TTS front end 716, a speech synthesis engine 718, TTS unit storage 772, TTS parametric storage 280, and a TTS back end 734. The TTS unit storage 772 may include, among other things, voice inventories 778a-288n that may include pre-recorded audio segments (called units) to be used by the unit selection engine 730 when performing unit selection synthesis as described below. The TTS parametric storage 280 may include, among other things, parametric settings 768a-268n that may be used by the parametric synthesis engine 732 when performing parametric synthesis as described below. A particular set of parametric settings 768 may correspond to a particular voice profile (e.g., whispered speech, excited speech, etc.).

In various embodiments of the present disclosure, model-based synthesis of audio data may be performed using by a speech model 722 and a TTS front-end 716. The TTS front-end 716 may be the same as front ends used in traditional unit selection or parametric systems. In other embodiments, some or all of the components of the TTS front end 716 are based on other trained models. The present disclosure is not, however, limited to any particular type of TTS front end 716. The speech model 722 may be used to synthesize speech without requiring the TTS unit storage 772 or the TTS parametric storage 280, as described in greater detail below.

The TTS front end 716 transforms input text data (from, for example, an application, user, device, or other text source such as NLG output 470 created by output generation component 460 and sent to TTS 280 by the orchestrator 230) into a symbolic linguistic representation, which may include linguistic context features such as phoneme data, punctuation data, syllable-level features, word-level features, and/or emotion, speaker, accent, or other features for processing by the speech synthesis engine 718. The syllable-level features may include syllable emphasis, syllable speech rate, syllable inflection, or other such syllable-level features; the word-level features may include word emphasis, word speech rate, word inflection, or other such word-level features. The emotion features may include data corresponding to an emotion associated with the NLG output data 470, such as surprise, anger, or fear. The speaker features may include data corresponding to a type of speaker, such as sex, age, or profession. The accent features may include data corresponding to an accent associated with the speaker, such as Southern, Boston, English, French, or other such accent.

The TTS front end 716 may also process other input data 715, such as text tags or text metadata, that may indicate, for example, how specific words should be pronounced, for example by indicating the desired output speech quality in tags formatted according to the speech synthesis markup language (SSML) or in some other form. For example, a first text tag may be included with text marking the beginning of when text should be whispered (e.g., <begin whisper>) and a second tag may be included with text marking the end of when text should be whispered (e.g., <end whisper>). The output generation component 460 may include tags in NLG output data 470 (or other input data 715) indicating which attributes to apply to which portions of the text. The tags may be included in the NLG output data 470 and/or the text for a TTS request may be accompanied by separate metadata indicating what text should be whispered (or have some other indicated audio characteristic). The speech synthesis engine 718 may compare the annotated phonetic units models and information stored in the TTS unit storage 772 and/or TTS parametric storage 280 for converting the input text into speech. The TTS front end 716 and speech synthesis engine 718 may include their own controller(s)/processor(s) and memory or they may use the controller/processor and memory of the server 120, device 110, or other device, for example. Similarly, the instructions for operating the TTS front end 716 and speech synthesis engine 718 may be located within the TTS component 280, within the memory and/or storage of the server 120, device 110, or within an external device.

The NLG output data 470 input into the TTS component 280 may be sent to the TTS front end 716 for processing. The front-end may include components for performing text normalization, linguistic analysis, linguistic prosody generation, or other such components. During text normalization, the TTS front end 716 may first process the text input and generate standard text, converting such things as numbers, abbreviations (such as Apt., St., etc.), symbols ($, %, etc.) into the equivalent of written out words.

During linguistic analysis, the TTS front end 716 may analyze the language in the normalized text to generate a sequence of phonetic units corresponding to the input text. This process may be referred to as grapheme-to-phoneme conversion. Phonetic units include symbolic representations of sound units to be eventually combined and output by the system as speech. Various sound units may be used for dividing text for purposes of speech synthesis. The TTS component 280 may process speech based on phonemes (individual sounds), half-phonemes, di-phones (the last half of one phoneme coupled with the first half of the adjacent phoneme), bi-phones (two consecutive phonemes), syllables, words, phrases, sentences, or other units. Each word may be mapped to one or more phonetic units. Such mapping may be performed using a language dictionary stored by the system, for example in the TTS storage component 772. The linguistic analysis performed by the TTS front end 716 may also identify different grammatical components such as prefixes, suffixes, phrases, punctuation, syntactic boundaries, or the like. Such grammatical components may be used by the TTS component 280 to craft a natural-sounding audio waveform output. The language dictionary may also include letter-to-sound rules and other tools that may be used to pronounce previously unidentified words or letter combinations that may be encountered by the TTS component 280. Generally, the more information included in the language dictionary, the higher quality the speech output.

Based on the linguistic analysis the TTS front end 716 may then perform linguistic prosody generation where the phonetic units are annotated with desired prosodic characteristics, also called acoustic features, which indicate how the desired phonetic units are to be pronounced in the eventual output speech. During this stage the TTS front end 716 may consider and incorporate any prosodic annotations that accompanied the text input to the TTS component 280. Such acoustic features may include syllable-level features, word-level features, emotion, speaker, accent, language, pitch, energy, duration, and the like. Application of acoustic features may be based on prosodic models available to the TTS component 280. Such prosodic models indicate how specific phonetic units are to be pronounced in certain circumstances. A prosodic model may consider, for example, a phoneme's position in a syllable, a syllable's position in a word, a word's position in a sentence or phrase, neighboring phonetic units, etc. As with the language dictionary, prosodic model with more information may result in higher quality speech output than prosodic models with less information. Further, a prosodic model and/or phonetic units may be used to indicate particular speech qualities of the speech to be synthesized, where those speech qualities may match the speech qualities of input speech (for example, the phonetic units may indicate prosodic characteristics to make the ultimately synthesized speech sound like a whisper based on the input speech being whispered).

The output of the TTS front end 716, which may be referred to as a symbolic linguistic representation, may include a sequence of phonetic units annotated with prosodic characteristics. This symbolic linguistic representation may be sent to the speech synthesis engine 718, which may also be known as a synthesizer, for conversion into an audio waveform of speech for output to an audio output device and eventually to a user. The speech synthesis engine 718 may be configured to convert the input text into high-quality natural-sounding speech in an efficient manner. Such high-quality speech may be configured to sound as much like a human speaker as possible, or may be configured to be understandable to a listener without attempts to mimic a precise human voice.

The speech synthesis engine 718 may perform speech synthesis using one or more different methods. In one method of synthesis called unit selection, described further below, a unit selection engine 730 matches the symbolic linguistic representation created by the TTS front end 716 against a database of recorded speech, such as a database (e.g., TTS unit storage 772) storing information regarding one or more voice corpuses (e.g., voice inventories 778*a-n*). Each voice inventory may correspond to various segments of audio that was recorded by a speaking human, such as a voice actor, where the segments are stored in an individual inventory 778 as acoustic units (e.g., phonemes, diphones, etc.). Each stored unit of audio may also be associated with an index listing various acoustic properties or other descriptive information about the unit. Each unit includes an audio waveform corresponding with a phonetic unit, such as a short .wav file of the specific sound, along with a description of various features associated with the audio waveform. For example, an index entry for a particular unit may include information such as a particular unit's pitch, energy, duration, harmonics, center frequency, where the phonetic unit appears in a word, sentence, or phrase, the neighboring phonetic units, or the like. The unit selection engine 730 may then use the information about each unit to select units to be joined together to form the speech output.

The unit selection engine 730 matches the symbolic linguistic representation against information about the spoken audio units in the database. The unit database may include multiple examples of phonetic units to provide the system with many different options for concatenating units into speech. Matching units which are determined to have the desired acoustic qualities to create the desired output audio are selected and concatenated together (for example by a synthesis component 720) to form output audio data 790 representing synthesized speech. Using all the information in the unit database, a unit selection engine 730 may match units to the input text to select units that can form a natural sounding waveform. One benefit of unit selection is that, depending on the size of the database, a natural sounding speech output may be generated. As described above, the larger the unit database of the voice corpus, the more likely the system will be able to construct natural sounding speech.

In another method of synthesis—called parametric synthesis—parameters such as frequency, volume, noise, are varied by a parametric synthesis engine 732, digital signal processor or other audio generation device to create an artificial speech waveform output. Parametric synthesis uses a computerized voice generator, sometimes called a vocoder. Parametric synthesis may use an acoustic model and various statistical techniques to match a symbolic linguistic representation with desired output speech parameters. Using parametric synthesis, a computing system (for example, a synthesis component 720) can generate audio waveforms having the desired acoustic properties. Parametric synthesis may include the ability to be accurate at high processing speeds, as well as the ability to process speech without large databases associated with unit selection, but also may produce an output speech quality that may not match that of unit selection. Unit selection and parametric techniques may be performed individually or combined together and/or combined with other synthesis techniques to produce speech audio output.

The TTS component 280 may be configured to perform TTS processing in multiple languages. For each language, the TTS component 280 may include specially configured data, instructions and/or components to synthesize speech in the desired language(s). To improve performance, the TTS component 280 may revise/update the contents of the TTS storage 280 based on feedback of the results of TTS processing, thus enabling the TTS component 280 to improve speech recognition.

The TTS storage component 280 may be customized for an individual user based on his/her individualized desired speech output. In particular, the speech unit stored in a unit database may be taken from input audio data of the user speaking. For example, to create the customized speech output of the system, the system may be configured with multiple voice inventories 778*a*-278*n*, where each unit database is configured with a different "voice" to match desired speech qualities. Such voice inventories may also be linked to user accounts. The voice selected by the TTS component 280 to synthesize the speech. For example, one voice corpus may be stored to be used to synthesize whispered speech (or speech approximating whispered speech), another may be stored to be used to synthesize excited speech (or speech approximating excited speech), and so on. To create the different voice corpuses a multitude of TTS training utterances may be spoken by an individual (such as a voice actor) and recorded by the system. The audio associated with the TTS training utterances may then be split into small audio segments and stored as part of a voice corpus. The individual speaking the TTS training utterances may speak in different voice qualities to create the customized voice corpuses, for example the individual may whisper the training utterances, say them in an excited voice, and so on. Thus the audio of each customized voice corpus may match the respective desired speech quality. The customized voice inventory 778 may then be used during runtime to perform unit selection to synthesize speech having a speech quality corresponding to the input speech quality.

Additionally, parametric synthesis may be used to synthesize speech with the desired speech quality. For parametric synthesis, parametric features may be configured that match the desired speech quality. If simulated excited speech was desired, parametric features may indicate an increased speech rate and/or pitch for the resulting speech. Many other examples are possible. The desired parametric features for particular speech qualities may be stored in a "voice" profile (e.g., parametric settings 768) and used for speech synthesis when the specific speech quality is desired. Customized voices may be created based on multiple desired speech qualities combined (for either unit selection or parametric synthesis). For example, one voice may be "shouted" while another voice may be "shouted and emphasized." Many such combinations are possible.

Unit selection speech synthesis may be performed as follows. Unit selection includes a two-step process. First a unit selection engine 730 determines what speech units to use and then it combines them so that the particular combined units match the desired phonemes and acoustic features and create the desired speech output. Units may be selected based on a cost function which represents how well particular units fit the speech segments to be synthesized. The cost function may represent a combination of different costs representing different aspects of how well a particular speech unit may work for a particular speech segment. For example, a target cost indicates how well an individual given speech unit matches the features of a desired speech output (e.g., pitch, prosody, etc.). A join cost represents how well a particular speech unit matches an adjacent speech unit (e.g., a speech unit appearing directly before or directly after the particular speech unit) for purposes of concatenating the speech units together in the eventual synthesized speech. The overall cost function is a combination of target cost, join cost, and other costs that may be determined by the unit selection engine 730. As part of unit selection, the unit selection engine 730 chooses the speech unit with the lowest overall combined cost. For example, a speech unit with a very low target cost may not necessarily be selected if its join cost is high.

The system may be configured with one or more voice corpuses for unit selection. Each voice corpus may include a speech unit database. The speech unit database may be stored in TTS unit storage 772 or in another storage component. For example, different unit selection databases may be stored in TTS unit storage 772. Each speech unit database (e.g., voice inventory) includes recorded speech utterances with the utterances' corresponding text aligned to the utterances. A speech unit database may include many hours of recorded speech (in the form of audio waveforms, feature vectors, or other formats), which may occupy a significant amount of storage. The unit samples in the speech unit database may be classified in a variety of ways including by phonetic unit (phoneme, diphone, word, etc.), linguistic prosodic label, acoustic feature sequence, speaker identity, etc. The sample utterances may be used to create mathematical models corresponding to desired audio output for particular speech units. When matching a symbolic linguistic representation the speech synthesis engine 718 may attempt to select a unit in the speech unit database that most closely matches the input text (including both phonetic units and prosodic annotations). Generally the larger the voice corpus/speech unit database the better the speech synthesis may be achieved by virtue of the greater number of unit samples that may be selected to form the precise desired speech output.

Vocoder-based parametric speech synthesis may be performed as follows. A TTS component 280 may include an acoustic model, or other models, which may convert a symbolic linguistic representation into a synthetic acoustic waveform of the text input based on audio signal manipulation. The acoustic model includes rules which may be used by the parametric synthesis engine 732 to assign specific audio waveform parameters to input phonetic units and/or prosodic annotations. The rules may be used to calculate a score representing a likelihood that a particular audio output parameter(s) (such as frequency, volume, etc.) corresponds to the portion of the input symbolic linguistic representation from the TTS front end 716.

The parametric synthesis engine 732 may use a number of techniques to match speech to be synthesized with input phonetic units and/or prosodic annotations. One common technique is using Hidden Markov Models (HMMs). HMMs may be used to determine probabilities that audio output should match textual input. HMMs may be used to translate from parameters from the linguistic and acoustic space to the parameters to be used by a vocoder (the digital voice encoder) to artificially synthesize the desired speech. Using HMMs, a number of states are presented, in which the states together represent one or more potential acoustic parameters to be output to the vocoder and each state is associated with a model, such as a Gaussian mixture model. Transitions between states may also have an associated probability, representing a likelihood that a current state may be reached from a previous state. Sounds to be output may be represented as paths between states of the MINI and multiple paths may represent multiple possible audio matches for the same input text. Each portion of text may be represented by multiple potential states corresponding to different known pronunciations of phonemes and their parts (such as the phoneme identity, stress, accent, position, etc.). An initial determination of a probability of a potential phoneme may be associated with one state. As new text is processed by the speech synthesis engine 718, the state may change or stay the same, based on the processing of the new text. For example, the pronunciation of a previously processed word might change based on later processed words. A Viterbi algorithm may be used to find the most likely sequence of states based on the processed text. The HMMs may generate speech in parameterized form including parameters such as fundamental frequency (f0), noise envelope, spectral envelope, etc. that are translated by a vocoder into audio segments. The output parameters may be configured for particular vocoders such as a STRAIGHT vocoder, TANDEM-STRAIGHT vocoder, WORLD vocoder, HNM (harmonic plus noise) based vocoders, CELP (code-excited linear prediction) vocoders, GlottHMM vocoders, HSM (harmonic/stochastic model) vocoders, or others.

In addition to calculating potential states for one audio waveform as a potential match to a phonetic unit, the parametric synthesis engine 732 may also calculate potential states for other potential audio outputs (such as various ways of pronouncing a particular phoneme or diphone) as potential acoustic matches for the acoustic unit. In this manner multiple states and state transition probabilities may be calculated.

The probable states and probable state transitions calculated by the parametric synthesis engine 732 may lead to a number of potential audio output sequences. Based on the acoustic model and other potential models, the potential audio output sequences may be scored according to a confidence level of the parametric synthesis engine 732. The highest scoring audio output sequence, including a stream of parameters to be synthesized, may be chosen and digital signal processing may be performed by a vocoder or similar component to create an audio output including synthesized speech waveforms corresponding to the parameters of the highest scoring audio output sequence and, if the proper sequence was selected, also corresponding to the input text. The different parametric settings 768, which may represent acoustic settings matching a particular parametric "voice", may be used by the synthesis component 722 to ultimately create the output audio data 790.

When performing unit selection, after a unit is selected by the unit selection engine 730, the audio data corresponding to the unit may be passed to the synthesis component 720. The synthesis component 720 may then process the audio data of the unit to create modified audio data where the modified audio data reflects a desired audio quality. The synthesis component 720 may store a variety of operations that can convert unit audio data into modified audio data where different operations may be performed based on the desired audio effect (e.g., whispering, shouting, etc.).

As an example, input text may be received along with metadata, such as SSML tags, indicating that a selected portion of the input text should be whispered when output by the TTS module 280. For each unit that corresponds to the selected portion, the synthesis component 720 may process the audio data for that unit to create a modified unit audio data. The modified unit audio data may then be concatenated to form the output audio data 790. The modified unit audio data may also be concatenated with non-modified audio data depending on when the desired whispered speech starts and/or ends. While the modified audio data may be sufficient to imbue the output audio data with the desired audio qualities, other factors may also impact the ultimate output of audio such as playback speed, background effects, or the like, that may be outside the control of the TTS module 280. In that case, other output data 785 may be output along with the output audio data 790 so that an ultimate playback device (e.g., device 110) receives instructions for playback that can assist in creating the desired output audio. Thus, the other output data 785 may include instructions or other data indicating playback device settings (such as volume, playback rate, etc.) or other data indicating how output audio data including synthesized speech should be output. For example, for whispered speech, the output audio data 790 may include other output data 785 that may include a prosody tag or other indicator that instructs the device 110 to slow down the playback of the output audio data 790, thus making the ultimate audio sound more like whispered speech, which is typically slower than normal speech. In another example, the other output data 785 may include a volume tag that instructs the device 110 to output the speech at a volume level less than a current volume setting of the device 110, thus improving the quiet whisper effect.

Figure 7B:
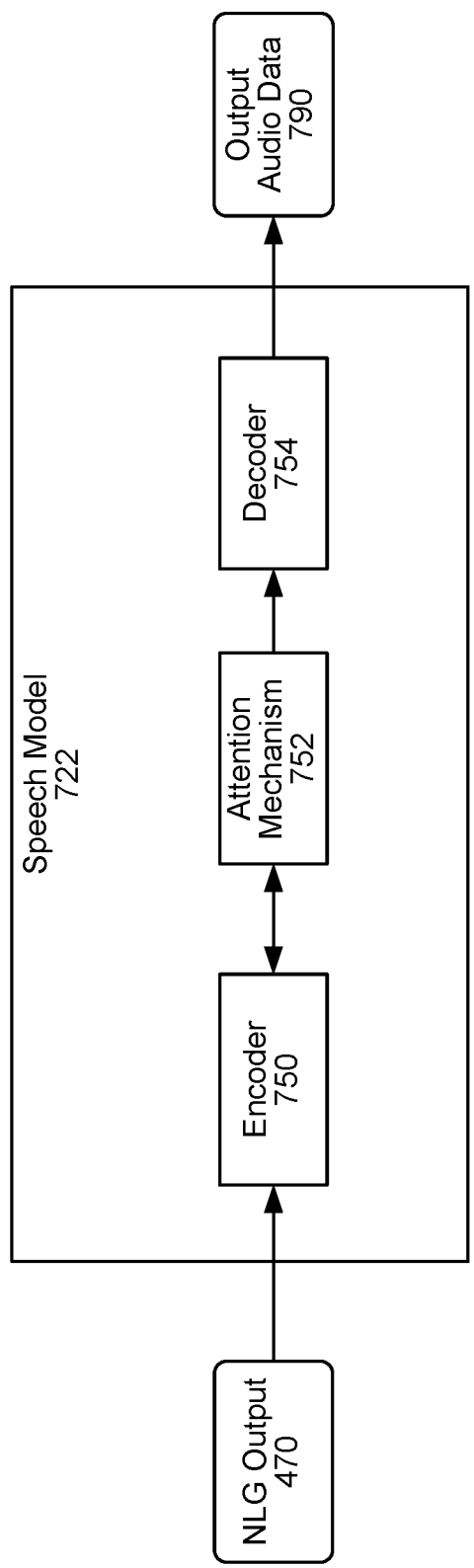
FIG. 7B is a conceptual diagram of a speech model according to embodiments of the present disclosure.

FIG. 7B illustrates an embodiment of the speech model 722. The speech model may include an encoder 750, attention mechanism 752, and a decoder 754. This arrangement of components may be referred to as a sequence-to-sequence model. The encoder 750 and/or decoder 754 may be neural networks having one or more layers. These layers may consist of one or more nodes; each node may receive input data or the output of a node from a previous layer and process that data in accordance with one or more model weights. For example, a node may multiply a value of an input with a model weight to produce an output. The neural networks may be deep neural networks (DNNs), convolutional neural networks (CNNs), and/or recurrent neural networks (RNNs). The neural networks may be trained using training data, such as recordings of utterances and corresponding text.

The encoder 750 may receive the NLG output data 470. The encoder 750 may encode this information into a context vector, which is input to the decoder 754. Optionally, an attention mechanism 752 may receive this context vector as well as outputs of other nodes of the encoder 750 and weight (e.g., "attend") different outputs of the encoder 750 differently. The decoder 754 may then generate output audio data 790 (which may include the response data) using the context vector and/or output of the attention mechanism 752.

Figure 8:
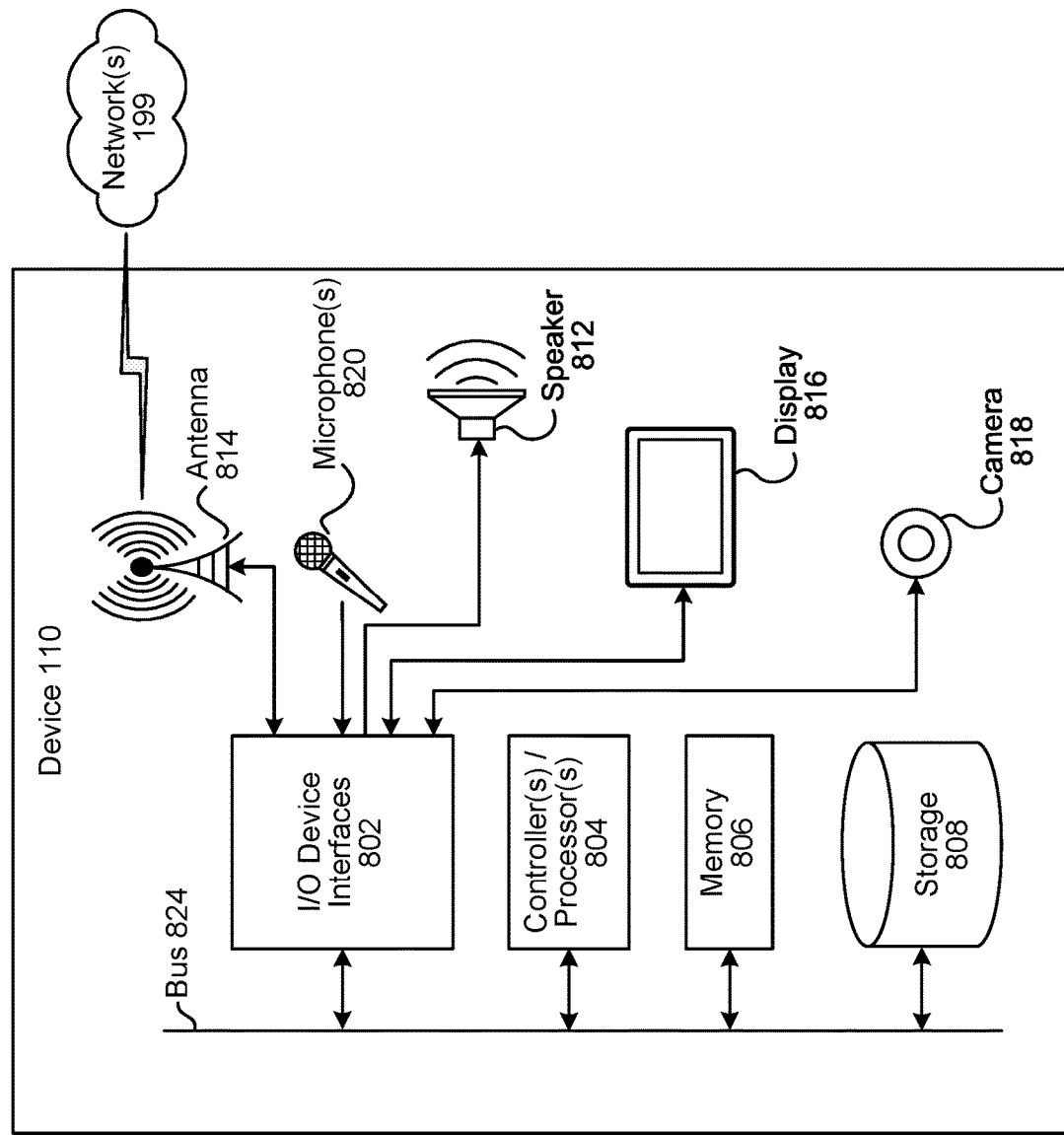
FIG. 8 is a block diagram conceptually illustrating example components of a device according to embodiments of the present disclosure.
Figure 9:
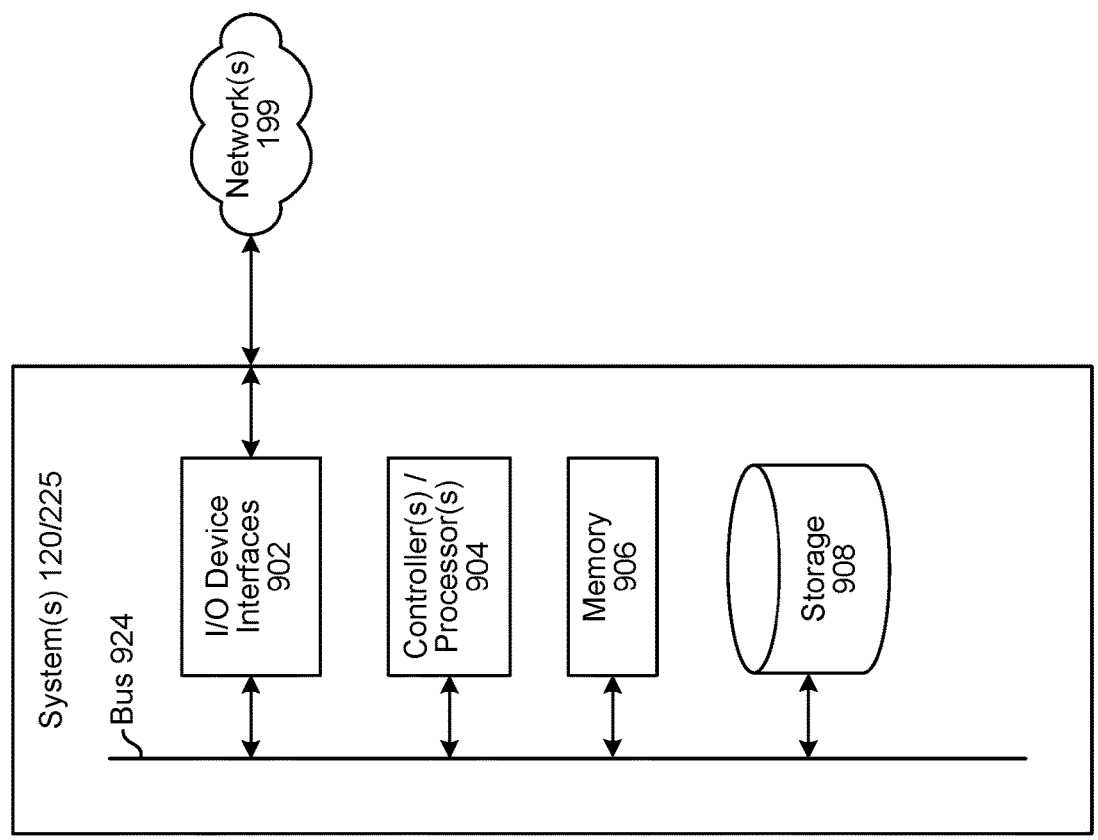
FIG. 9 is a block diagram conceptually illustrating example components of a system according to embodiments of the present disclosure.

FIG. 8 is a block diagram conceptually illustrating a device 110 that may be used with the system. FIG. 9 is a block diagram conceptually illustrating example components of a remote device, such as the system(s) 120, which may assist with ASR processing, NLU processing, etc., and the skill system(s) 225. A system (120/225) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server(s) may be configured to operate using one or more of a client-server model, a computer bureau model, grid computing techniques, fog computing techniques, mainframe techniques, utility computing techniques, a peer-to-peer model, sandbox techniques, or other computing techniques.

Multiple systems (120/225) may be included in the overall system of the present disclosure, such as one or more systems 120 for performing ASR processing, one or more systems 120 for performing NLU processing, one or more skill systems 225 for performing actions responsive to user inputs, etc. In operation, each of these systems may include computer-readable and computer-executable instructions that reside on the respective device (120/225), as will be discussed further below.

Each of these devices (110/120/225) may include one or more controllers/processors (804/904), which may each include a central processing unit (CPU) for processing data and computer-readable instructions, and a memory (806/906) for storing data and instructions of the respective device. The memories (806/906) may individually include volatile random access memory (RAM), non-volatile read only memory (ROM), non-volatile magnetoresistive memory (MRAM), and/or other types of memory. Each device (110/120/225) may also include a data storage component (808/908) for storing data and controller/processor-executable instructions. Each data storage component (808/908) may individually include one or more non-volatile storage types such as magnetic storage, optical storage, solid-state storage, etc. Each device (110/120/225) may also be connected to removable or external non-volatile memory and/or storage (such as a removable memory card, memory key drive, networked storage, etc.) through respective input/output device interfaces (802/902).

Computer instructions for operating each device (110/120/225) and its various components may be executed by the respective device's controller(s)/processor(s) (804/904), using the memory (806/906) as temporary "working" storage at runtime. A device's computer instructions may be stored in a non-transitory manner in non-volatile memory (806/906), storage (808/908), or an external device(s). Alternatively, some or all of the executable instructions may be embedded in hardware or firmware on the respective device in addition to or instead of software.

Each device (110/120/225) includes input/output device interfaces (802/902). A variety of components may be connected through the input/output device interfaces (802/902), as will be discussed further below. Additionally, each device (110/120/225) may include an address/data bus (824/924) for conveying data among components of the respective device. Each component within a device (110/120/225) may also be directly connected to other components in addition to (or instead of) being connected to other components across the bus (824/924).

Referring to FIG. 8, the device 110 may include input/output device interfaces 802 that connect to a variety of components such as an audio output component such as a speaker 812, a wired headset or a wireless headset (not illustrated), or other component capable of outputting audio. The device 110 may also include an audio capture component. The audio capture component may be, for example, a microphone 820 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 816 for displaying content. The device 110 may further include a camera 818.

Via antenna(s) 814, the input/output device interfaces 802 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (802/902) may also include communication components that allow data to be exchanged between devices such as different physical servers in a collection of servers or other components.

The components of the device(s) 110, the system(s) 120, or the skill system(s) 225 may include their own dedicated processors, memory, and/or storage. Alternatively, one or more of the components of the device(s) 110, the system(s) 120, or the skill system(s) 225 may utilize the I/O interfaces (802/902), processor(s) (804/904), memory (806/906), and/or storage (808/908) of the device(s) 110 system(s) 120, or the skill system(s) 225, respectively. Thus, the ASR component 250 may have its own I/O interface(s), processor(s), memory, and/or storage; the NLU component 260 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110, the system(s) 120, and the skill system(s) 225, as described herein, are illustrative, and may be located as a stand-alone device or may be included, in whole or in part, as a component of a larger device or system.

Figure 10:
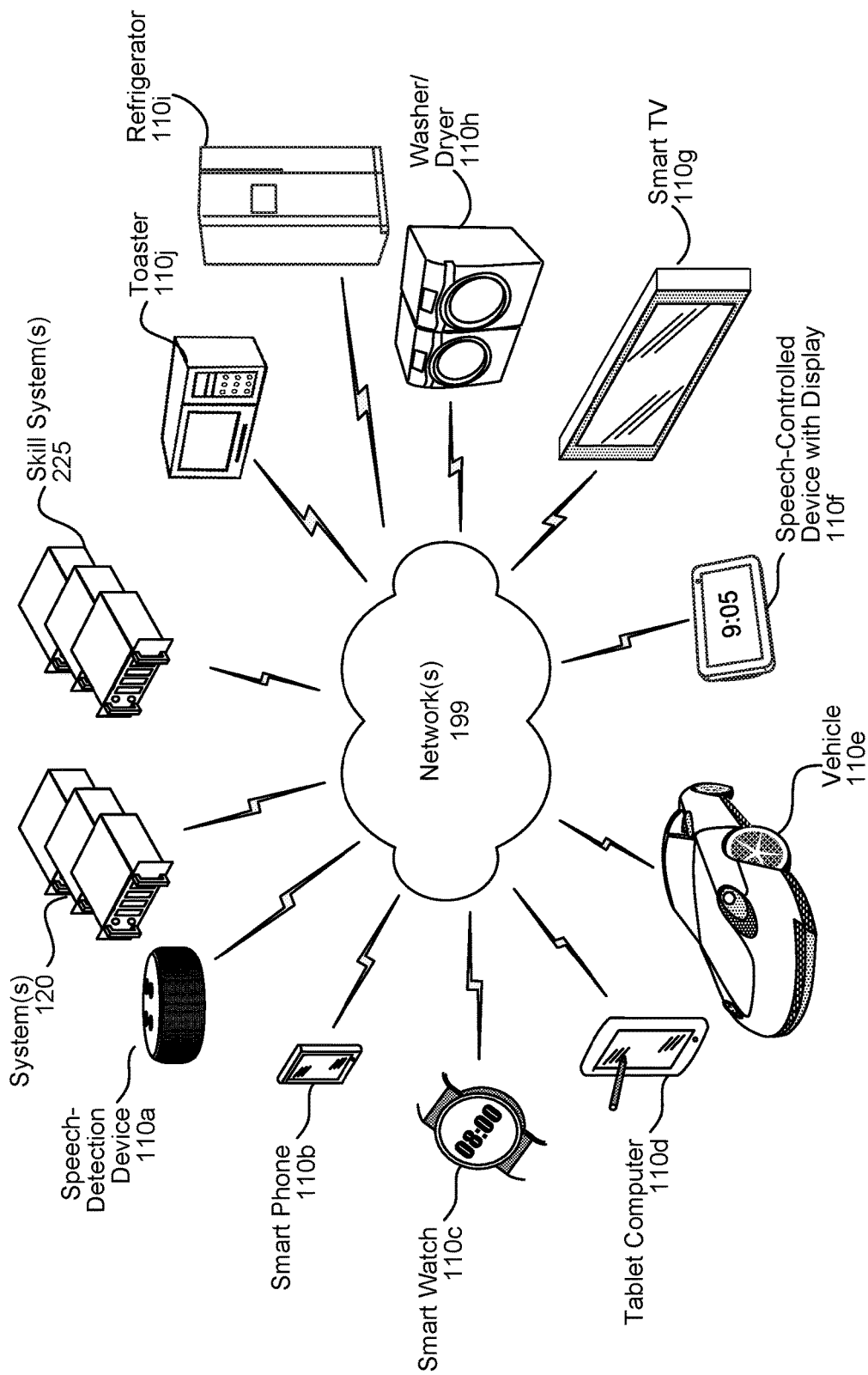
FIG. 10 illustrates an example of a computer network for use with the speech processing system.

As illustrated in FIG. 10, multiple devices (110*a*-110*j*, 120, 225) may contain components of the system and the devices may be connected over a network(s) 199. The network(s) 199 may include a local or private network or may include a wide network such as the Internet. Devices may be connected to the network(s) 199 through either wired or wireless connections. For example, a speech-detection device 110*a*, a smart phone 110*b*, a smart watch 110*c*, a tablet computer 110*d*, a vehicle 110*e*, a speech-controlled device with a display 110*f*, a smart television 110*g*, a washer/dryer 110*h*, a refrigerator 110*i*, and/or a microwave 110*j* may be connected to the network(s) 199 through a wireless service provider, over a WiFi or cellular network connection, or the like. Other devices are included as network-connected support devices, such as the system(s) 120, the skill system(s) 225, and/or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as the ASR component 250, the NLU component 260, etc. of one or more systems 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:
   receiving, from a first device, first audio data representing a first utterance;
   determining first output data responsive to the first utterance, the first output data being a first natural language output including a first plurality of words;
   determining the first device corresponds to a first location;
   identifying, using a model configured to determine a language generation profile, a first language generation profile associated with the first location, wherein the model was trained using location data and a plurality of language generation profiles;
   using a natural language generation (NLG) component, processing the first output data to determine second output data representing a second natural language output, wherein processing the first output data comprises:
      determining the first language generation profile represents a first word to be inserted in the first natural language output,
      determining the first language generation profile represents a position indicating that the first word is to be inserted after the first plurality of words, and
      determining the second output data to include the first plurality of words followed by the first word;
   processing, using text-to-speech (TTS) processing, the second output data to determine first output audio data representing first synthesized speech; and
   sending the first output audio data to the first device.

2. The computer-implemented method of claim 1, further comprising:
   receiving, from a second device, second audio data representing a second utterance;
   performing spoken language understanding (SLU) processing on the second audio data to determine entity data corresponding to the second utterance;
   determining third output data responsive to the second utterance, the third output data being a third natural language output including a second plurality of words;
   identifying, using the model, a second language generation profile associated with an entity type associated with the entity data, wherein the model was further trained using entity types and the plurality of language generation profiles;
   using the NLG component, processing the third output data to determine fourth output data representing a fourth natural language output, wherein processing the third output data comprises:
      determining the second language generation profile represents a second word to be inserted before the third natural language output,
      determining the second language generation profile indicates a second speech prosody to be applied to the second word,
      determining a second SSML tag based on the second speech prosody,
      determining the fourth output data to include the second word followed by the second plurality of words, and
      associating the second SSML tag with a portion of the fourth output data, the portion corresponding to the second word;
   processing the fourth output data to determine second output audio data representing second synthesized speech; and
   sending the second output audio data to the second device.

3. The computer-implemented method of claim 1, further comprising:
receiving second audio data representing a second utterance, the second audio data being associated with a user profile;
determining third output data responsive to the second utterance, the third output data being a third natural language output;
identifying, using the model, a second language generation profile associated with the user profile, wherein the model was further trained using user profile data and the plurality of language generation profiles;
using the NLG component, processing the third output data to determine fourth output data representing a fourth natural language output, wherein processing the third output data comprises:
determining a topic category corresponding to the third output data, and
determining, based on the topic category, to disregard the second language generation profile in determining the fourth natural language output; and
processing the fourth output data to determine second output audio data representing second synthesized speech.

4. The computer-implemented method of claim 1, further comprising:
receiving second audio data representing a second utterance, the second audio data associated with a user profile;
determining third output data responsive to the second utterance, the third output data being a third natural language output including a second plurality of words;
identifying, using the model, a second language generation profile associated with the user profile, wherein the model was further trained using user profile data and the plurality of language generation profiles;
using the NLG component, processing the third output data to determine fourth output data representing a fourth natural language output, wherein processing the third output data comprises:
determining the second language generation profile represents a second word that is to replace a third word of the second plurality of words,
determining the second language generation profile indicates an arrangement for the second plurality of words, and
determining the fourth output data to include a third plurality of words comprising of the second word and words other than the third word of the second plurality of words, the third plurality of words arranged according to the arrangement; and
processing the fourth output data to determine second output audio data representing second synthesized speech.

5. A computer-implemented method comprising:
receiving, from a device, first data corresponding to a first user input;
receiving second data representing a first natural language output responsive to the first user input, the first natural language output including at least a first word;
processing, using a model configured to determine a language generation profile, at least the first data to determine a first language generation profile to be used to respond to the first user input, the first language generation profile including first word data, wherein the model was trained using a plurality of language generation profiles;
selecting, based on the second data, at least a second word from the first word data wherein the first word data includes third data representing an insertion position of the at least second word;
determining, using the second data, first output data representing a second natural language output, wherein the second natural language output includes the at least first word and the at least second word and wherein the at least second word is positioned, based on the third data, relative to the at least first word; and
processing, using text-to-speech (TTS) processing, the first output data to determine output audio data.

6. The computer-implemented method of claim 5, further comprising:
determining that a third word in the first natural language output corresponds to an entity;
determining that the first language generation profile is associated with an entity type associated with the entity, the first word data representing a fourth word to be inserted after the third word; and
determining the second natural language output to include the at least first word, the second word, the third word, and the fourth word after the third word.

7. The computer-implemented method of claim 5, wherein processing the first data further comprises:
determining a device identifier associated with the device that received the first user input, the first data including the device identifier; and
determining that the first language generation profile is associated with the device identifier.

8. The computer-implemented method of claim 5, wherein determining the first output data further comprises:
determining the first word data represents the second word to be inserted in the first natural language output after the at least first word; and
determining the second natural language output to include the at least first word followed by the second word.

9. The computer-implemented method of claim 8, wherein determining the first output data further comprises:
determining the first language generation profile representing a speech prosody to be applied to the second word;
determining a speech synthesis markup language (SSML) tag based on the speech prosody; and
determining the first output data to include the SSML tag associated with the second word.

10. The computer-implemented method of claim 5, wherein determining the first output data further comprises:
determining the first word data represents at least a third word that is to replace the at least first word;
determining the first language generation profile indicates an arrangement of words to be used; and
determining the first output data to include a plurality of words comprising the third word instead of the first word and at least a fourth word included in the first natural language output, the plurality of words being arranged according to the arrangement.

11. The computer-implemented method of claim 5, further comprising:
based on the first data and the second data, requesting, from a spoken language understanding (SLU) processing component, additional information to include in the second natural language output; and
receiving fourth data representing first additional information to include in the second natural language output, wherein determining the first output data further comprises including at least a third word representing the fourth data.

12. The computer-implemented method of claim 5, further comprising:
receiving fourth data corresponding to a second user input;
receiving fifth data representing a third natural language output responsive to the second user input;
processing, using the model, the fourth data to determine a second language generation profile to be used to respond to the second user input;
determining a topic category corresponding to the fifth data;
determining, based on the topic category, to disregard the second language generation profile in determining second output data; and
processing the fifth data to determine second output audio data.

13. A system comprising:
at least one processor; and
at least one memory including instructions that, when executed by the at least one processor, cause the system to:
receive, from a device, first data corresponding to a first user input;
receive second data representing a first natural language output responsive to the first user input, the first natural language output including at least a first word;
process, using a model configured to determine a language generation profile, at least the first data to determine a first language generation profile to be used to respond to the first user input, the first language generation profile including first word data, wherein the model was trained using a plurality of language generation profiles;
select, based on the second data, at least a second word from the first word data wherein the first word data includes third data representing an insertion position of the at least second word;
determine, using the second data, first output data representing a second natural language output, wherein the second natural language output includes the at least first word and the at least second word and wherein the at least second word is positioned, based on the third data, relative to the at least first word; and
process, using text-to-speech (TTS) processing, the first output data to determine output audio data.

14. The system of claim 13, wherein the instructions that cause the system to process the first data further causes the system to:
determine that a third word in the first natural language output corresponds to an entity;
determine that the first language generation profile is associated with an entity type associated with the entity, the first word data representing a fourth word to be inserted after the third word; and
determine the second natural language output to include the at least first word, the second word, the third word, and the fourth word after the third word.

15. The system of claim 13, wherein the instructions that cause the system to process the first data further causes the system to:
determine a device identifier associated with the device that received the first user input, the first data including the device identifier; and
determine that the first language generation profile is associated with the device identifier.

16. The system of claim 13, wherein the instructions that cause the system to determine the first output data further causes the system to:
determine the first word data represents the second word to be inserted in the first natural language output after the at least first word; and
determine the second natural language output to include the at least first word followed by the second word.

17. The system of claim 16, wherein the instructions that cause the system to determine the first output data further causes the system to:
determine the first language generation profile representing a speech prosody to be applied to the second word;
determine a speech synthesis markup language (SSML) tag based on the speech prosody; and
determine the first output data to include the SSML tag associated with the second word.

18. The system of claim 13, wherein the instructions that cause the system to determine the first output data further causes the system to:
determine the first word data represents at least a third word that is to replace the at least first word;
determine the first language generation profile indicates an arrangement of words to be used; and
determine the first output data include a plurality of words comprising the third word instead of the first word and at least a fourth word included in the first natural language output, the plurality of words being arranged according to the arrangement.

19. The system of claim 13, wherein the instructions that, when executed by the at least one processor, further cause the system to:
based on the first data and the second data, request, from a spoken language understanding (SLU) processing component, additional information to include in the second natural language output; and
receive fourth data representing first additional information to include in the second natural language output, wherein the first output data includes at least a third word representing the fourth data.

20. The system of claim 13, wherein the instructions that, when executed by the at least one processor, further cause the system to:
receive fourth data corresponding to a second user input;
receive fifth data representing a third natural language output responsive to the second user input;
process, using the model, the fourth data to determine a second language generation profile to be used to respond to the second user input;
determine a topic category corresponding to the fifth data;
determine, based on the topic category, to disregard the second language generation profile in determining second output data; and
process the fifth data to determine second output audio data.

* * * * *